US006604078B1

(12) United States Patent
Shimazaki

(10) Patent No.: US 6,604,078 B1
(45) Date of Patent: Aug. 5, 2003

(54) VOICE EDIT DEVICE AND MECHANICALLY READABLE RECORDING MEDIUM IN WHICH PROGRAM IS RECORDED

(75) Inventor: Izumi Shimazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 526 days.

(21) Appl. No.: 09/641,242

(22) Filed: Aug. 18, 2000

(30) Foreign Application Priority Data

Aug. 23, 1999 (JP) .......................................... 11-235021

(51) Int. Cl.[7] ............................................... G01L 11/00
(52) U.S. Cl. ...................................................... 704/278
(58) Field of Search ................................ 704/235, 260, 704/270, 275–278

(56) References Cited

U.S. PATENT DOCUMENTS

| | | | | |
|---|---|---|---|---|
| 4,627,001 A | * 12/1986 | Stapleford et al. | .......... | 704/260 |
| 4,779,209 A | * 10/1988 | Stapleford et al. | .......... | 704/278 |
| 5,909,667 A | * 6/1999 | Leontiades et al. | ......... | 704/275 |
| 5,970,448 A | * 10/1999 | Goldhor et al. | ............. | 704/235 |
| 6,122,613 A | * 9/2000 | Baker | ......................... | 704/235 |
| 6,199,042 B1 | * 3/2001 | Kurzweil | .................... | 706/260 |
| 6,336,093 B2 | * 1/2002 | Fasciano | ..................... | 704/278 |

FOREIGN PATENT DOCUMENTS

| | | |
|---|---|---|
| JP | 4-19874 | 1/1992 |
| JP | 4-212767 | 8/1992 |
| JP | 7-160289 | 6/1995 |
| JP | 7-226931 | 8/1995 |
| JP | 10-20881 | 1/1998 |

* cited by examiner

*Primary Examiner*—David D. Knepper
(74) *Attorney, Agent, or Firm*—Foley & Lardner

(57) ABSTRACT

In a voice edit device for editing voice information, the voice information is stored in a voice information storage unit 21, text information corresponding to the voice information stored in the voice information storage unit 21 is stored in a text information storage unit 23, and voice/text association information indicating the corresponding relationship between the voice information and the text information is stored in a voice/text association information storage unit 22. When the voice information is edited, a user indicates an edit target portion on a text displayed on a display device 6, and indicates an edit type. Display control means 12 outputs text edit target portion information indicating the text information which corresponds to the edit target portion indicated on the text, and editing means 14 edits the voice information stored in the voice information storage unit 21 on the basis of the text edit target portion information, the voice/text association information and the edit type.

6 Claims, 21 Drawing Sheets

FIG. 2

VOICE/TEXT ASSOCIATION INFORMATION STORAGE UNIT

22

| ADDRESS OF TEXT INFORMATION STORAGE UNIT | ADDRESS OF VOICE INFORMATION STORAGE UNIT |
|---|---|
| 0 | 0, 1, 2, 3, 4 |
| 1 | 5, 6, 7, 8, 9, 10 |
| 2 | 11, 12, 13, 14, 15 |
| ⋮ | ⋮ |

VOICE EDIT DEVICE AND MECHANICALLY READABLE RECORDING MEDIUM IN WHICH PROGRAM IS RECORDED

BACKGROUND OF THE INVENTION

1. Field of the Invention

The present invention relates to a voice edit technique of editing voice information and particularly, to a voice edit technique of enabling an edit work of voice information to be performed in short time by enabling a quick indication of an edit target portion of the voice information.

2. Description of the Prior Art

Edit of voice information such as rearrangement of voice information and deletion of voice information has been generally carried out by using a magnetic tape. However, there is a disadvantage that the edition using the magnetic tape needs a long time to access an edit target portion because the magnetic tape is a sequential access recording medium. In order to solve this disadvantage, it has been hitherto proposed to use a directly-accessible magnetic disc or optical disc as a recording medium (for example, Japanese Laid-open Patent Publication No. Hei-4-19874 and Japanese Laid-open Patent Publication No. Hei-4-212767).

If voice information is recorded on a directly-accessible recording medium such as a magnetic disc or the like, an edit target portion can be accessed in short time by indicating an address. However, in order to enable an access to the edit target portion on the basis of the address indication, it is required that a recording content is reproduced before the edition to check which voice information is recorded at each address of a recording medium and record the check result. Therefore, much time and much labor are needed for this preparation work.

Also, Japanese Laid-open Patent Publication No. Hei-7-160289 and Japanese Laid-open Patent Publication No. Hei-7-226931 disclose a technique of recording voice information and text information in association with each other, however, never disclose a technique of editing voice information by editing text information.

SUMMARY OF THE INVENTION

Therefore, an object of the present invention is to enable an edit of voice information to be performed in short time without any cumbersome preparation work by converting a voice input in a voice input operation to voice information and text information, recording both the voice information and the text information in association with each other, and enabling the voice information to be edited by merely editing the text information when the voice information is edited.

In order to attain the above object, a voice editing device according to the present invention comprises: a voice input device for inputting voices; a voice information storage unit for storing voice information; a text information storage unit for storing text information associated with the voice information stored in the voice information storage unit; a voice/text association information storage unit for storing voice/text association information indicating the corresponding relationship between the voice information stored in the voice information storage unit and the text information stored in the text information storage unit; voice information/text information-converting means for generating the voice information and the text information corresponding to the voices input from the voice input device and storing the voice information and the text information thus generated into the voice information storage unit and the text information storage unit, respectively, and storing into the voice/text association information storage unit the voice/text association information indicating the corresponding relationship between the voice information and the text information stored in the voice information storage unit and the text information storage unit, respectively; a display device for display a text; an input device for indicating an edit target portion on the text displayed on the display device according to a user's operation, and inputting an edit type; display control means for displaying the text on the display device according to the text information stored in the text information storage unit, and outputting a text edit target portion information which corresponds to the edit target portion designated on the text and indicates the text information stored in the text information storage unit; and editing means for editing the content of the text information storage unit on the basis of the text edit target portion information output from the display control means and the edit type input from the input device, obtaining, on the basis of the text edit target portion information and the voice/text association information, a voice edit target portion which corresponds to the edit target portion indicated on the text and indicates the voice information stored in the voice information storage unit, and editing the content of the voice information storage unit on the basis of the voice edit target portion information and the edit type input from the input device.

In this construction, when a user indicates an edit target portion of voice information on a text, the display control means outputs the text edit target portion information, and the editing means obtains, on the basis of the text edit target portion information and the content of the voice/text association information storage unit, the voice edit target portion information which corresponds to the edit target portion indicated on the text and indicates the voice information stored in the voice information storage unit, and edits the content of the voice information storage unit on the basis of the voice edit target portion information and the edit type input from the input device.

In order to facilitate the correction of the voice information, in the above voice edit device of the present invention, when the edit type input from the input device is "correction", the editing means outputs to the voice information/text information-converting means a correcting instruction which contains a text edit target portion information indicating the text information stored in the text information storage unit and a voice edit target portion information indicating the voice information stored in the voice information storage unit, which correspond to the edit target portion indicated on the text, and when the correcting instruction is applied from the editing means, the voice information/text information-converting means corrects the content of the text information storage unit on the basis of the text edit target portion information contained in the correcting instruction and the text information corresponding to the voice input from the voice input device, and corrects the content of the voice information storage unit on the basis of the voice edit target portion information contained in the correcting instruction and the voice information corresponding to the voice input from the voice input device.

In this construction, the editing means outputs to the voice information/text information-converting means the correcting instruction which contains the text edit target portion information indicating the text information stored in the text information storage unit and the voice edit target portion information indicating the voice information stored in the voice information storage unit, which correspond to the edit target portion indicated on the text. Further, when the correcting instruction is applied from the editing means, the voice information/text information-converting means corrects the content of the text information storage unit on the basis of the text edit target portion information contained in the correcting instruction and the text information corresponding to the voice input from the voice input device, and corrects the content of the voice information storage unit on the basis of the voice edit target portion information contained in the correcting instruction and the voice information corresponding to the voice input from the voice input device.

Further, in order to enable a quick access to a portion which the user wishes to reproduce, in the voice edit device of the present invention, the input device indicates a reproduction target portion on text displayed on the display device and inputs a reproduction instruction, the display control means outputs reproduction target portion information indicating text information stored in the text information storage unit, which corresponds to the reproduction target portion indicated on the text, and the voice edit device further includes reproducing means for obtaining, on the basis of the reproduction target portion information output from the display control means and the voice/text association information, voice information which is stored in the voice information storage unit and corresponds to the reproduction target portion indicated on the text when the reproduction instruction is input from the input device, and then reproducing the voice information thus obtained.

In the above construction, when a user indicates the reproduction target portion on the text displayed on the display device by using the input device, the display control means outputs the reproduction target portion information which corresponds to the reproduction target portion indicated on the text and indicates the text information stored in the text information storage unit, and on the basis of the reproduction target portion information output from the display control means and the voice/text association information, the reproducing means obtains the voice information which corresponds to the reproduction target portion indicated on the text and is stored in the voice information storage unit, and then reproduces the voice information thus obtained.

BRIEF DESCRIPTION OF THE DRAWINGS

FIG. 2 is a diagram showing a content of a voice/text association information storage unit 22;

DETAILED DESCRIPTION OF THE PREFERRED EMBODIMENTS

Preferred embodiments according to the present invention will be described hereunder with reference to the accompanying drawings.

Figure 1:
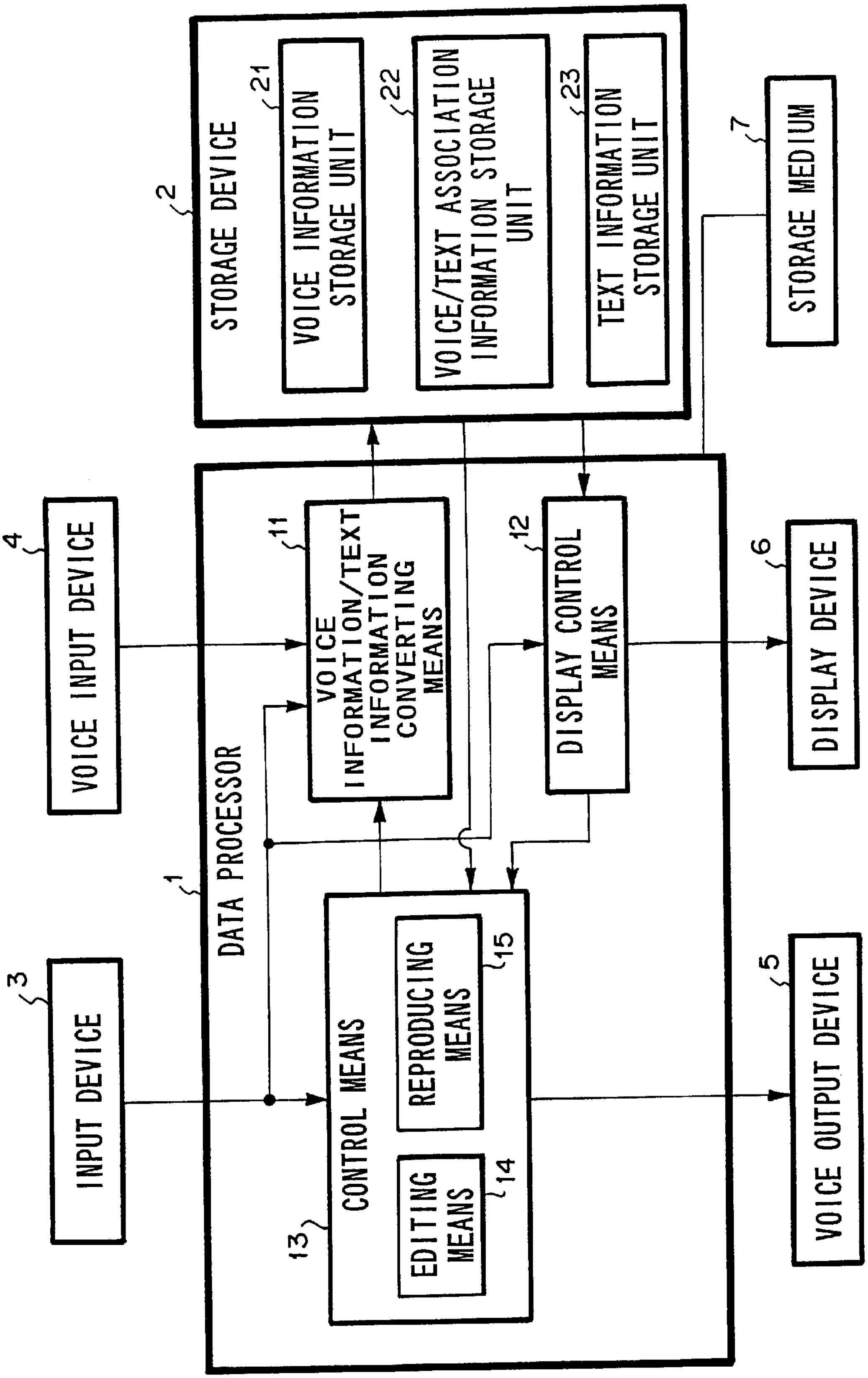
FIG. 1 is a block diagram showing an embodiment of the present invention.

FIG. 1 is a block diagram showing an embodiment of the present invention.

In FIG. 1, the system of the embodiment of the present invention includes data processor 1 comprising a computer, storage device 2 which can be directly accessed (such as a magnetic disc device), input device 3 such as a keyboard, voice input device 4 such as a microphone, voice output device 5 such as a speaker, and a display device 6 such as a CRT (Cathode Ray Tube).

The storage device 2 includes voice information storage unit 21, voice/text association information storage unit 22 and text information storage unit 23.

Digitized voice information is stored in the voice information storage unit 21, and text information (character codes) corresponding to the voice information stored in the voice information storage unit 21 is stored in the text information storage unit 23. Further, voice/text association information indicating the corresponding relationship between the voice information stored in the voice information storage unit 21 and the text information stored in the text information storage unit 23 is stored in the voice/text association information storage unit 22.

FIG. 2 is a diagram showing the content of the voice/text association information storage unit 22. The addresses of the voice information storage unit 21 are stored in association with each address of the text information storage unit 23 in the voice/text association information storage unit 22. In this case, FIG. 2 shows that the character codes stored at addresses 0, 1, . . . of the text information storage unit 23 are associated with the voice information stored at the addresses 0 to 4, the addresses 5 to 10, . . . of the voice information storage unit 21, respectively.

The data processor 1 has voice information/text information-converting means 11, display control means 12 and control means 13.

The voice information/text information-converting means 11 has a function of generating the voice information by performing AD conversion on the voices input from the voice input device 4 while sampling the voices at a predetermined period, a function of storing voice information into the voice information storage unit 21, a function of converting the voice information to Kana character codes, a function of converting a Kana character code string to Kanji and Kana mixed text information, a function of storing text information into the text information storage unit 23, a function of storing voice/text association information indicating the corresponding relationship between the voice information and the text information into the voice/text association information storage unit 22.

The display control means 12 has a function of displaying a text on the display device according to the text information stored in the text information storage unit 23, a function of outputting text edit target portion information and reproduction target portion information which indicate the text information corresponding to an edit target portion and a reproduction target portion indicated on the text displayed on the display device 6. In this embodiment, the addresses of the text information storage unit 23 which correspond to the edit target portion and the reproduction target portion are output as the text edit target portion information and the reproduction target portion information.

The control means 13 has editing means 14 and reproducing means 15.

The editing means 14 has a function of editing the contents of the voice information storage unit 21 and the text information storage unit 23 by using an edit type (correction, rearrangement, deletion and text editing) which a user inputs by using the input device 3 and by using an edit target portion which a user indicates on a text displayed on the display device 6 by using the input device 3, and a function of correcting the content of the voice/text association information storage unit 22 to data indicating the corresponding relationship between the voice information and the text information after the editing.

The reproducing means 15 has a function of reading from the voice information storage unit 21 the voice information corresponding to the reproduction target portion which the user indicates on the text displayed on the display device 6 by using the input device 3, subjecting the voice information thus read to DA conversion, and then outputting the DA-converted voice information to the voice output device 5.

Recording medium 7 connected to the data processor 1 is a disc, a semiconductor memory or other recording medium. The recording medium 7 is recorded a program which enables the data processor to function as a part of a voice edit device. This program is read out by the data processor 1, and controls the operation of the data processor 1, thereby realizing the voice information/text information-converting means 11, the display control means 12 and the control means 13 on the data processor 1.

Next, the operation of this embodiment will be described.

First, the operation when voices are input will be described.

Figure 3:
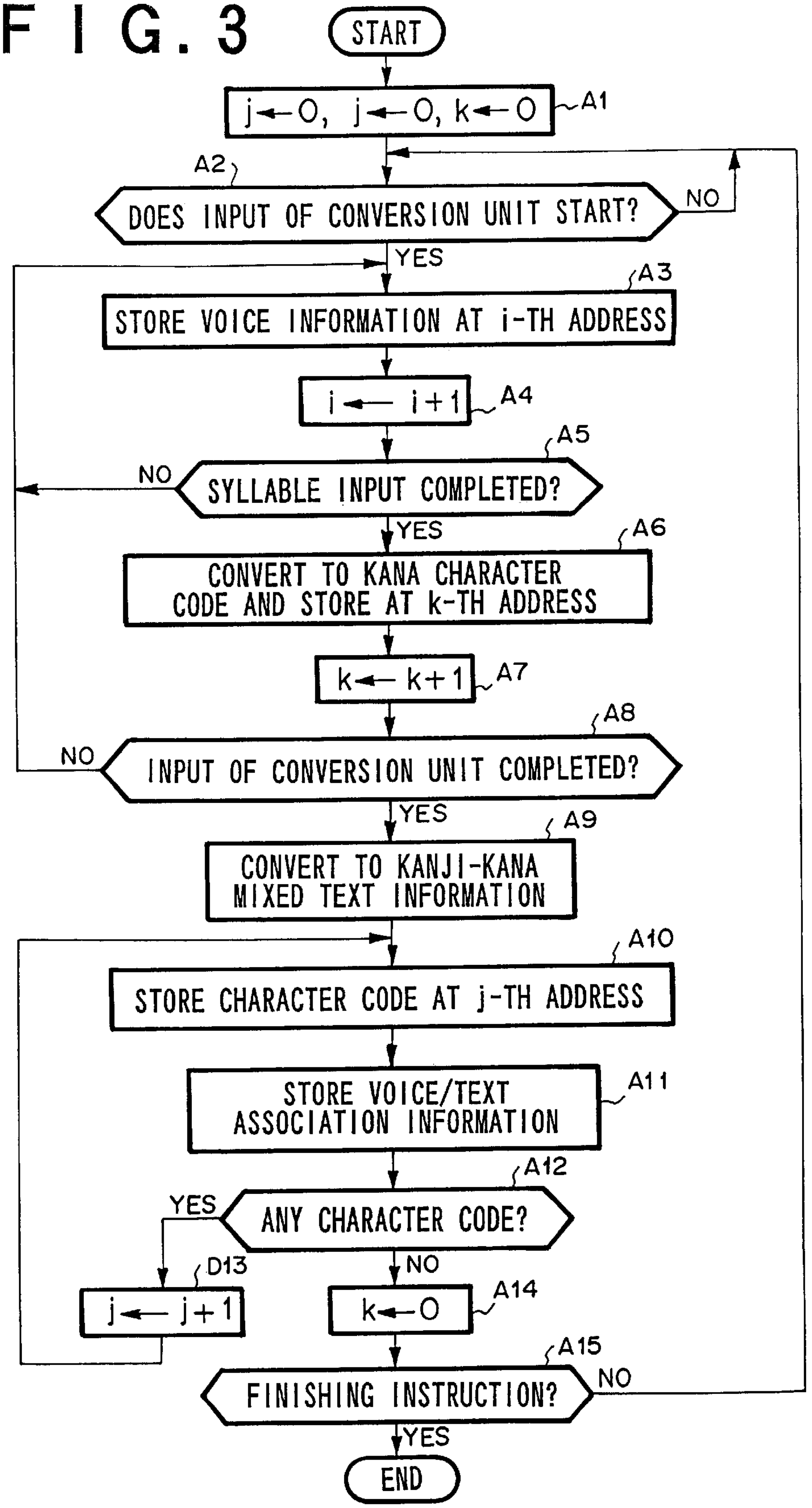
FIG. 3 is a flowchart showing processing of voice information/text information-converting means 11 when a voice is input.
Figure 4:
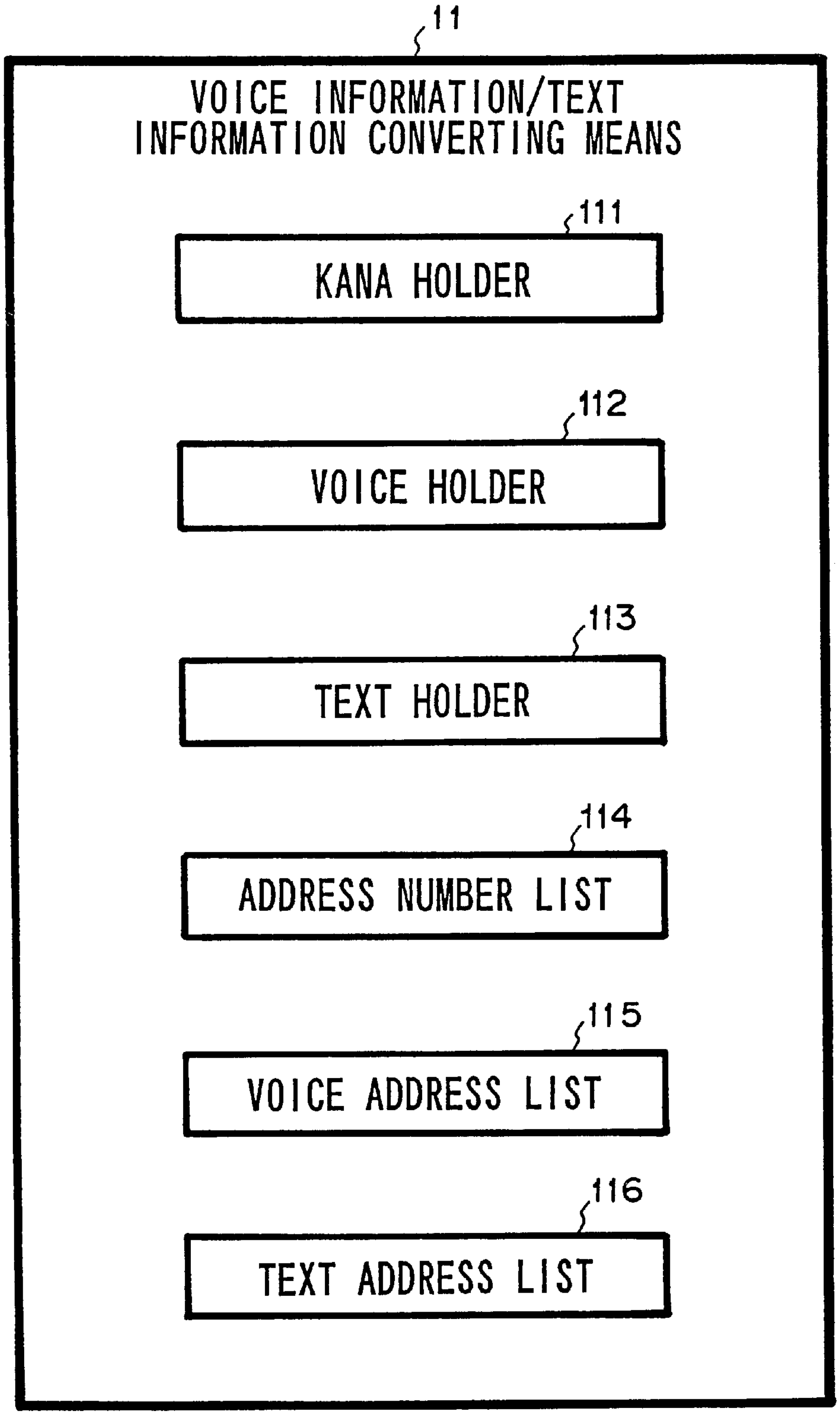
FIG. 4 is a diagram showing information holders and lists equipped to the voice information/text information-converting means 11.

When a user starts to input his/her voice by using the voice input device 4, the voice information/text information-converting means 11 starts the processing shown in the flowchart of FIG. 3, first sets all the values of variables i, j, k indicating the addresses of the voice information storage unit 21, the text information storage unit 23 and a Kana holder 111 to "0" (step A). The Kana holder 111 is a storage unit for temporarily storing Kana character codes, and it is provided in the voice information/text information-converting means 11 as shown in FIG. 4. In addition to the Kana holder 111, the voice information/text information-converting means 11 is provided with a voice holder 112 for temporarily holding voice information, a text holder 113 for temporarily holding text information, an address number list 114 for temporarily holding the number of addresses, a voice address list 115 for temporarily holding the address of the voice information storage unit 21, and a text address list 116 for temporarily holding the address of the text information storage unit 23.

The voice input from the voice input device 4 is converted to a digital signal (voice information) by a sampling circuit and an AD converter (not shown). When the voice information is output from the AD converter, the voice information/text information-converting means 11 stores the voice information at an address i of the voice information storage unit 21, and then increases i by +1 (steps A3, A4). Thereafter, the voice information/text information-converting means 11 judges whether input of the voice information of one syllable is completed (step A5).

Therefore, if it is judged that the input of the voice information of one syllable is not completed (the judgment of step A5 is "NO"), the processing returns to the step A3. On the other hand, if it is judged that the input of the voice information of one syllable is completed (the judgment of step A5 is "YES"), the voice information of one syllable thus currently-input is converted to a Kana character code and stored at an address k of the Kana holder 111, and then k is increased by +1 (steps A6, A7).

Thereafter, for example, by judging whether a soundless time exceeds a predetermined time, the voice information/text information-converting means 11 judges whether input of a conversion unit to text information is completed (step A8). If it is judged that the input of the conversion unit is not completed (the judgment of step A8 is "NO"), the processing returns to the step A3. On the other hand, if it is judged that the input of the conversion unit is completed (the judgment of the step A8 is "YES"), a Kana character code held in the Kana holder 111 is converted to Kanji-Kana mixed text information (step A9).

Thereafter, the voice information/text information-converting means 11 stores the respective character codes in the text information generated in the step A9 from the address j of the text information storage unit 23 in order (steps A10, A13), and stores into the voice/text association information storage unit 22 voice/text association information comparising a pair of the address of the text information storage unit 23 which carries out the storage of the character code and the address of the voice information storage unit 21 which stores the voice information corresponding to the character code (step A11).

Here, the address of the voice information storage unit 21 corresponding to the address of the text information storage unit 23 in which the character code is stored can be determined as follows. When the voice information is converted to a Kana character code in step A6, the character code thus converted and the address of the voice information storage unit 21 in which the voice information corresponding to the Kana character code is stored are recorded with being associated with each other. Further, when the Kana character code is converted to Kanji-Kana mixed text information in step A9, each character code in the text information and the Kana code corresponding to the character code are recorded with being associated with each other. In step A11, the address of the voice information storage unit 21 in which the voice information corresponding to the character code stored at the address j of the text information storage unit 23 in step A10 is stored is determined on the basis of the information recorded in steps A6, A9. For example, in a case where the character code stored at the address "100" of the text information storage unit 23 in step A10 indicates "Hon (book)", by recording the Kana codes "Ho", "n" corresponding to the "Hon" in step A9 and also recording the addresses "1000 to 1005" and "1006 to 1011" of the voice information storage unit 21 which correspond to the Kana character codes "Ho" and "n" in step A6, it can be easily found from the above information that the address of the voice information storage unit 21 corresponding to the address "100" of the text information storage unit 23 in which the character code "Hon" is stored indicates "1000 to 1011".

When the processing on all the character codes in the text information generated in step A9 is completed (the judgment of step A12 is "NO"), the voice information/text information-converting means 11 sets k to "0" (step A14), and then the processing returns to step A2 to be kept on standby until input of a conversion unit (voice) is started.

The voice information/text information-converting means 11 repeats the above processing, and when the end of the voice input is instructed by the user (the judgment of step A15 is "YES"), the processing is finished.

Next, an editing operation will be described. When an edit is carried out by the user, the user first instructs the display control means 12 to display a text by using the input device 3. In response to the instruction, the display control means 12 displays on the display device 6 the text indicated by the text information stored in the text information storage unit 23.

Thereafter, the user inputs the edit type to the editing means 14 by using the input device 3, and further indicates an edit target portion on the text displayed on the display device 6 by using the input device 3. The indication of the edit target portion is carried out by tracing the edit target portion with a cursor.

Figure 5:
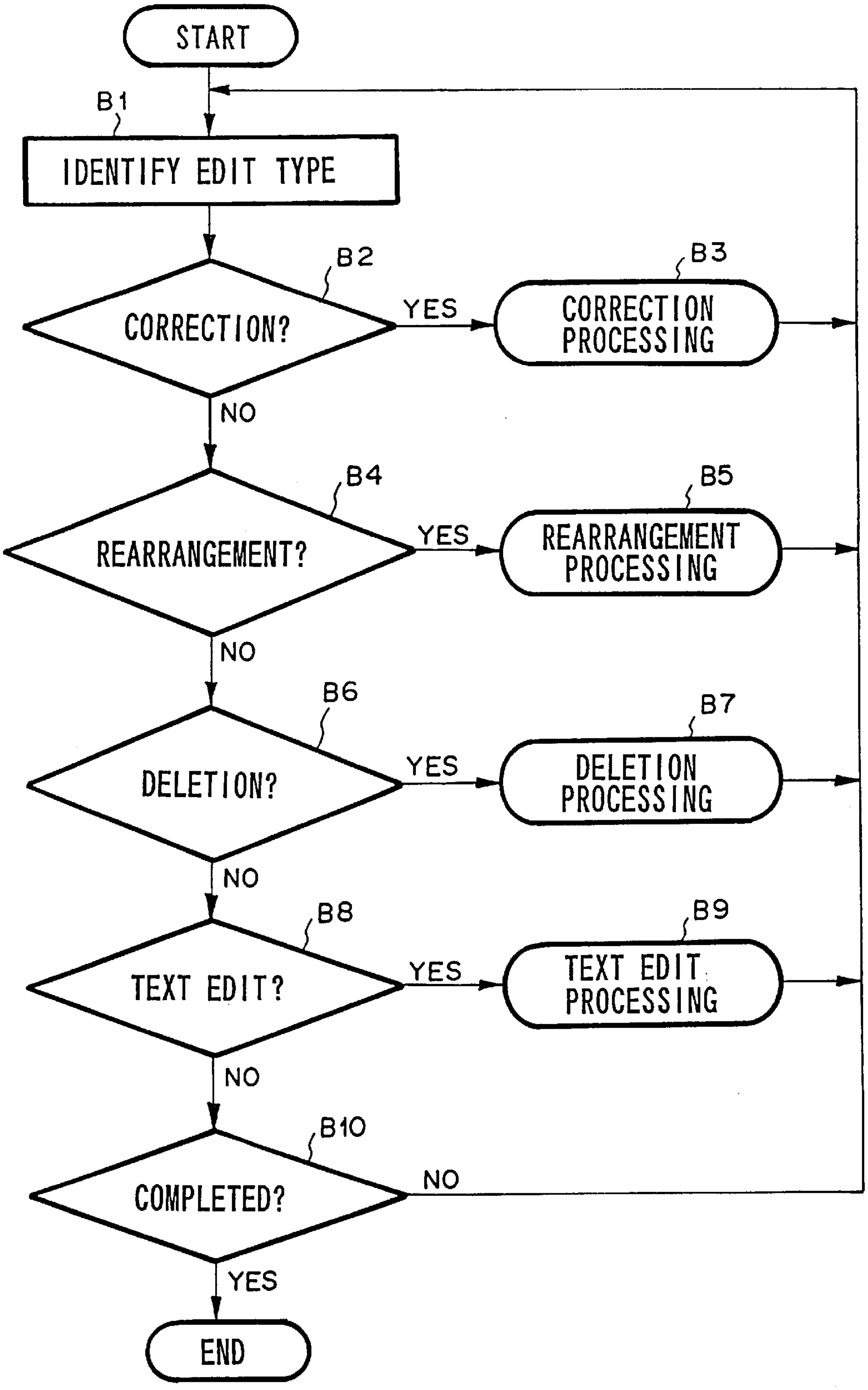
FIG. 5 is a flowchart showing the processing when an edit is carried out.

Upon input of the edit type from the input device 3, the editing means 14 identifies the edit type, and carried out the processing corresponding to the judgment result (steps B1 to B9 in FIG. 5). That is, when the edit type thus input is "correction", the "correction processing" of step B3 is carried out. When the edit type thus input is "rearrangement", the "rearrangement processing" of step B5 is carried out. When the edit type thus input is "deletion", the "deletion processing" of step B7 is carried out. When the edit type thus input is "text edit", the "text edit processing" of step B9 is carried out.

First, the correction processing carried out in step B3 of the processing carried out in steps B3, B5, B7, B9 will be described.

Figure 6:
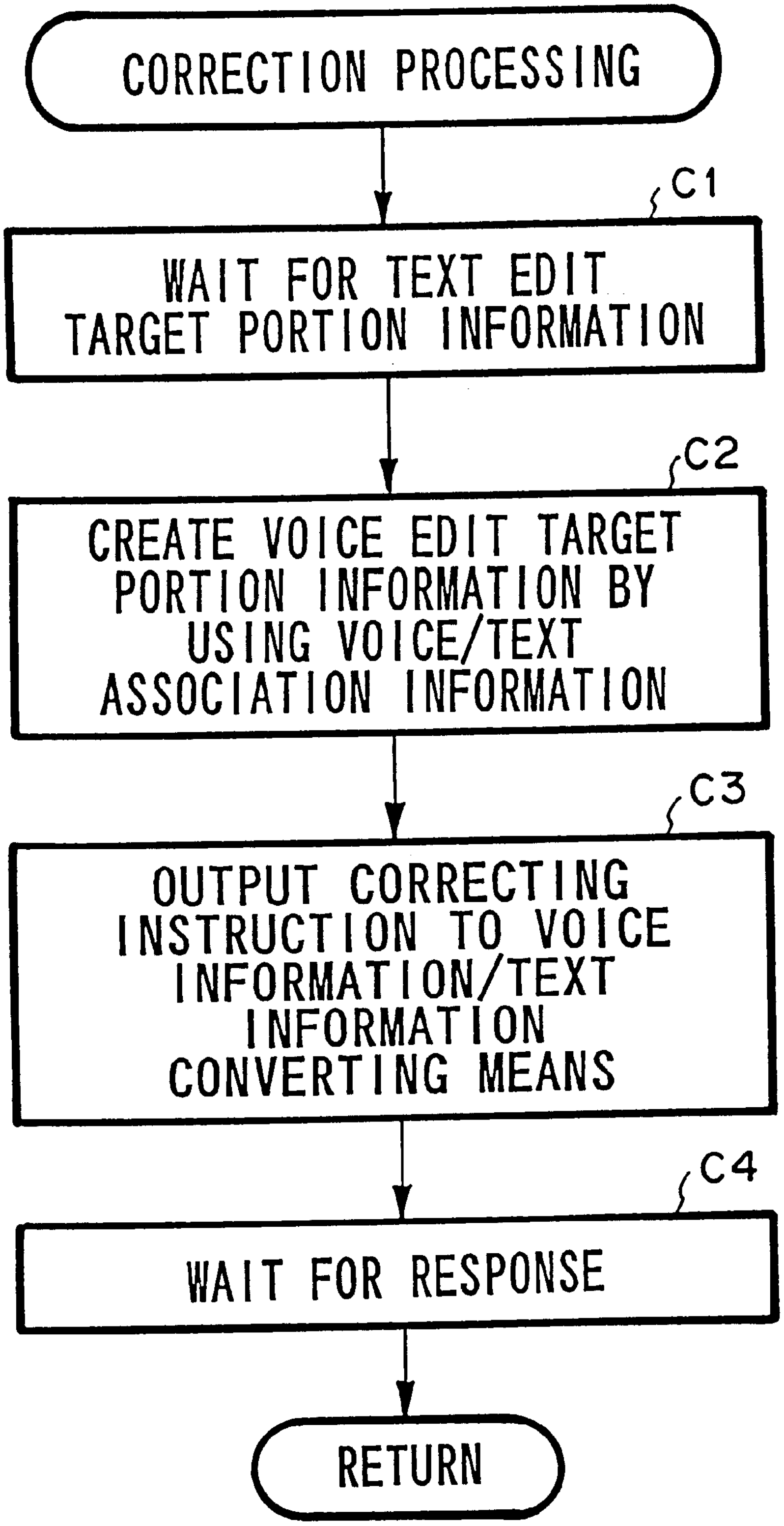
FIG. 6 is a flowchart showing the processing of editing means 14 when correction processing is carried out.

In the correction processing of step B3, the editing means 14 is on standby until text edit target portion information is sent from the display control means 12, as shown in the flowchart of FIG. 6 (step C1). The text edit target portion information indicates an address of the text information storage unit 23 at which the character code of each character existing in the edit target portion indicated on the text is stored, and the display control means 12 outputs text edit target portion information to the editing means 14 when an edit target portion is indicated on the text by the user.

Subsequently, the editing means 14 determines the address of the voice information storage unit 21 which corresponds to each address (the address of the text information storage unit 23) contained in the text edit target portion information by using the voice/text association information stored in the voice/text association information storage unit 22, and sets the address thus determined as voice edit target portion information (step C2).

Thereafter, the editing means 14 outputs a correction instruction containing the text edit target portion information, the voice edit target portion information and the information indicating the corresponding relationship between the text edit target portion information and the voice edit target portion information to the voice information/text information-converting means 11 (step C3), and waits for a response from the voice information/text information-converting means 11 (step C4).

Figure 7:
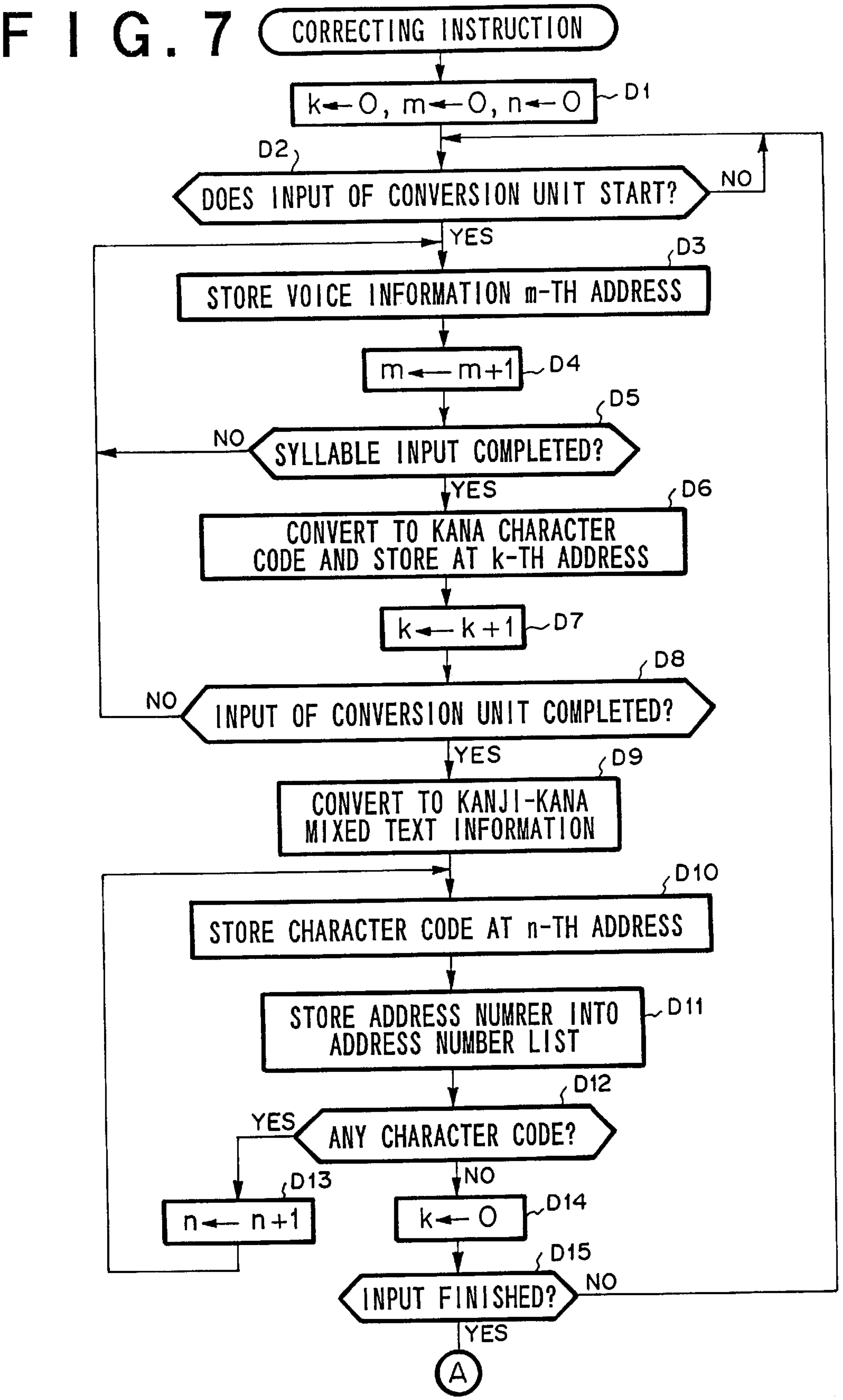
FIG. 7 is a flowchart showing the processing of the voice information/text information-converting means 11 when the correction processing is carried out.

When the correction instruction is applied from the editing means 14, the voice information/text information-converting means 11 sets the values of variables k, m, n indicating the addresses of the Kana holder 111, the voice holder 112 and the text holder 113 to "0" as shown in the flowchart of FIG. 7 (step D1).

Thereafter, when the user input a voice after correction from the voice input device 4 (the judgment of step D2 is "YES"), the voice information output from the AD converter (not shown) is stored at an address m of the voice holder 112, and then increases m by +1 (steps D3, D4). Thereafter, the voice information/text information-converting means 11 judges whether the input of the voice information of one syllable is completed (step D5).

If it is judged that the input of the voice information of one syllable is not completed (the judgment of the step D5 is "NO"), the processing returns to step D3. On the other hand, if it is judged that the input of the voice information of one syllable is completed (the judgment of the step D5 is "YES"), the voice information of one syllable which is currently input is converted to a Kana character code, stored at the address k of the Kana holder 111 and then increases k by +1 (steps D6, D7).

Thereafter, for example, by judging whether the soundless time exceeds a predetermined time, the voice information/text information-converting means 11 judges whether the input of the conversion unit to the text information is completed (step D8). If it is judged that the input of the conversion unit is not completed (the judgment of step D8 is "NO"), the processing returns to step D3. On the other hand, if it is that the input of the conversion unit is completed (the judgment of the step D8 is "YES"), the Kana character code held in the Kana holder 111 is converted to the Kanji-Kana mixed text information (step D9).

When the Kanji-Kana mixed text information is generated in step D9, the head character code in each character code of the text information is stored at an n-th address of the text holder 113 (step D10), and further an address number indicating the number of addresses of the voice information required to generate the character code is linked to an address number list 114 (step D11). Thereafter, n is increased by +1 and the stored address of the character code is set to a next address (step D13), and then the next character code is stored at the address n of the text holder portion 113, and also an address number indicating the number of addresses of the voice information required to generate the character code is linked to the address number list 114 (steps D10, D11).

When all the character codes in the text information generated in step D9 are stored in the text holder 113 (the judgment of step D12 is "NO"), k is set to "0" (step D14) and then the processing of step D2 is carried out again. The above processing is repeated until the end of voice input is notified by the. user (the judgment of step D15 is "YES").

Figure 8:
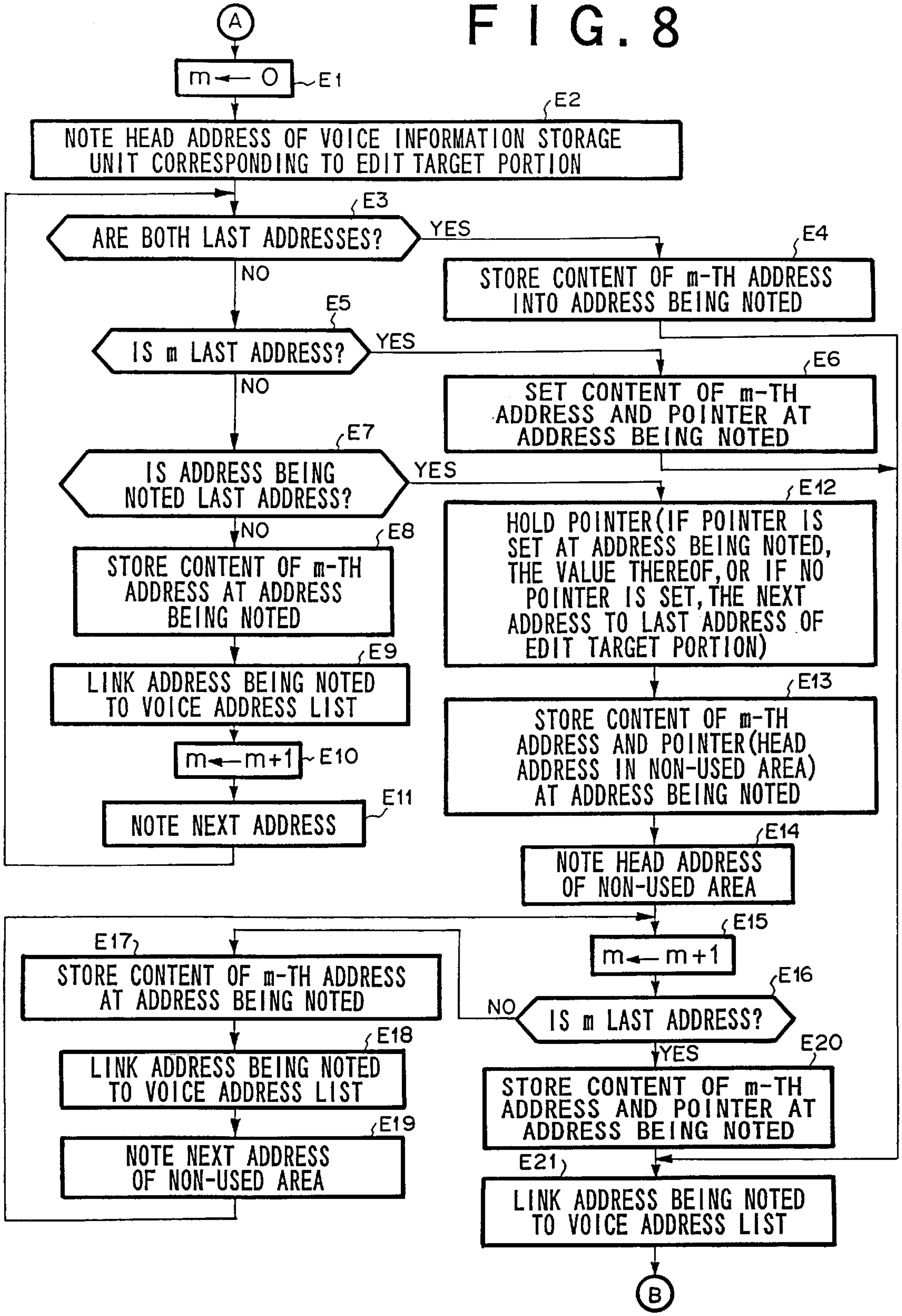
FIG. 8 is a flowchart showing the processing of the voice information/text information-converting means 11 when the correction processing is carried out.

When the end of the voice input is notified by the user, the value of a variable m indicating the address of the voice holder 112 is set to "0" as shown in the flowchart of FIG. 8 (step El).

Thereafter, the voice information/text information-converting means 11 notes the head address in the addresses of the voice information storage unit 21 at which the voice information corresponding to the head character code of the edit target portion indicated on the text by the user is stored (step E2). This address can be known on the basis of the voice edit target portion information contained in the editing instruction sent from the editing means 14.

Figure 11:
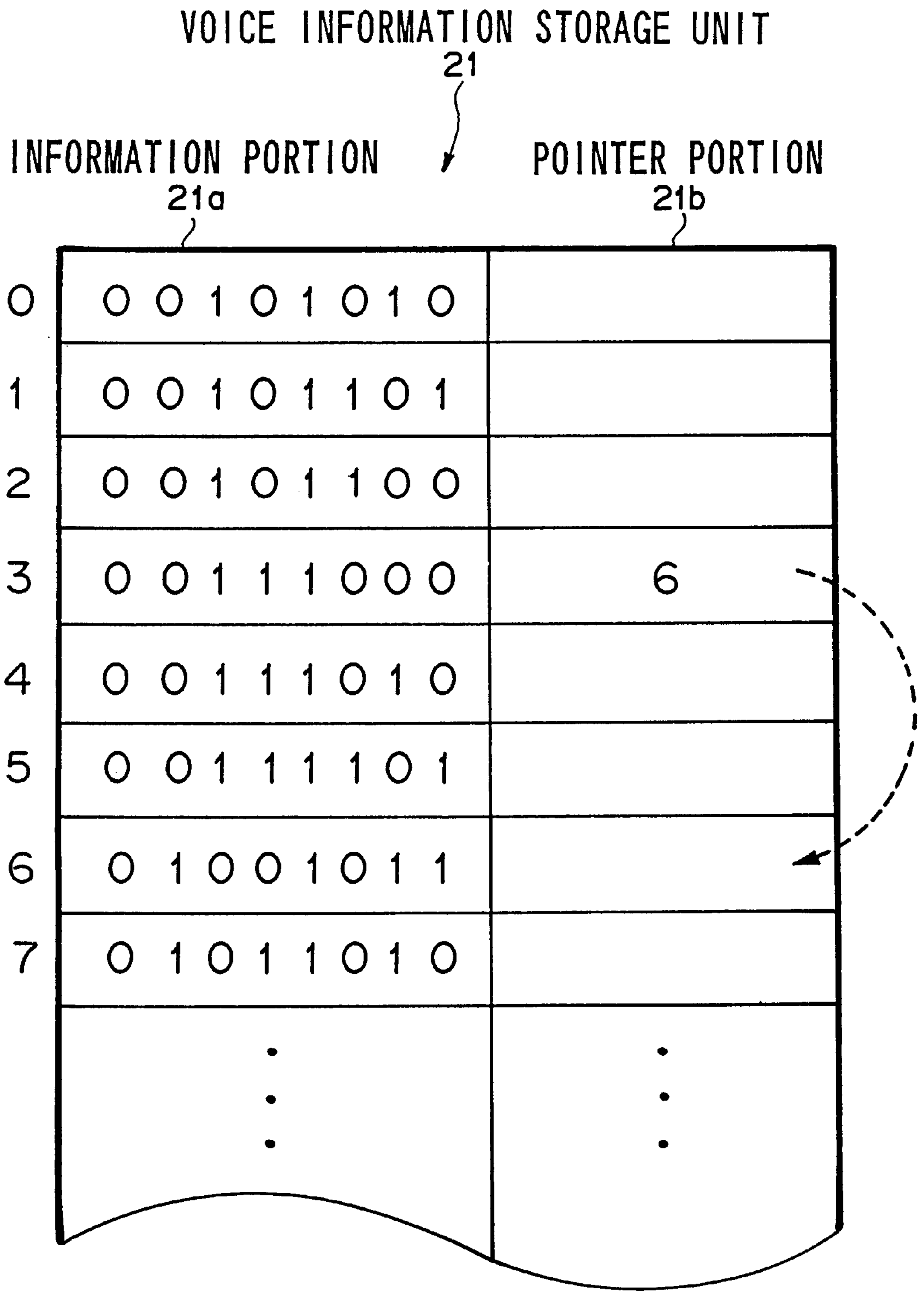
FIG. 11 is a diagram showing the construction of the voice information storage unit 21.

FIG. 11 shows the construction of the voice information storage unit 21, and the voice information storage unit 21 comprises information portion 21*a* in which voice information is stored, and pointer portion 21*b* in which a pointer is stored. The pointer is used when the reproducing order of the voice information is set to be different from the address order, and indicates an address to be next reproduced. When voice information at an address for which no pointer is set is reproduced, the voice information at the next address is reproduced. Accordingly, in the case of FIG. 11, the reproduction is carried out in the order of 0, 1, 2, 3, 6, 7, . . . .

Figure 12:
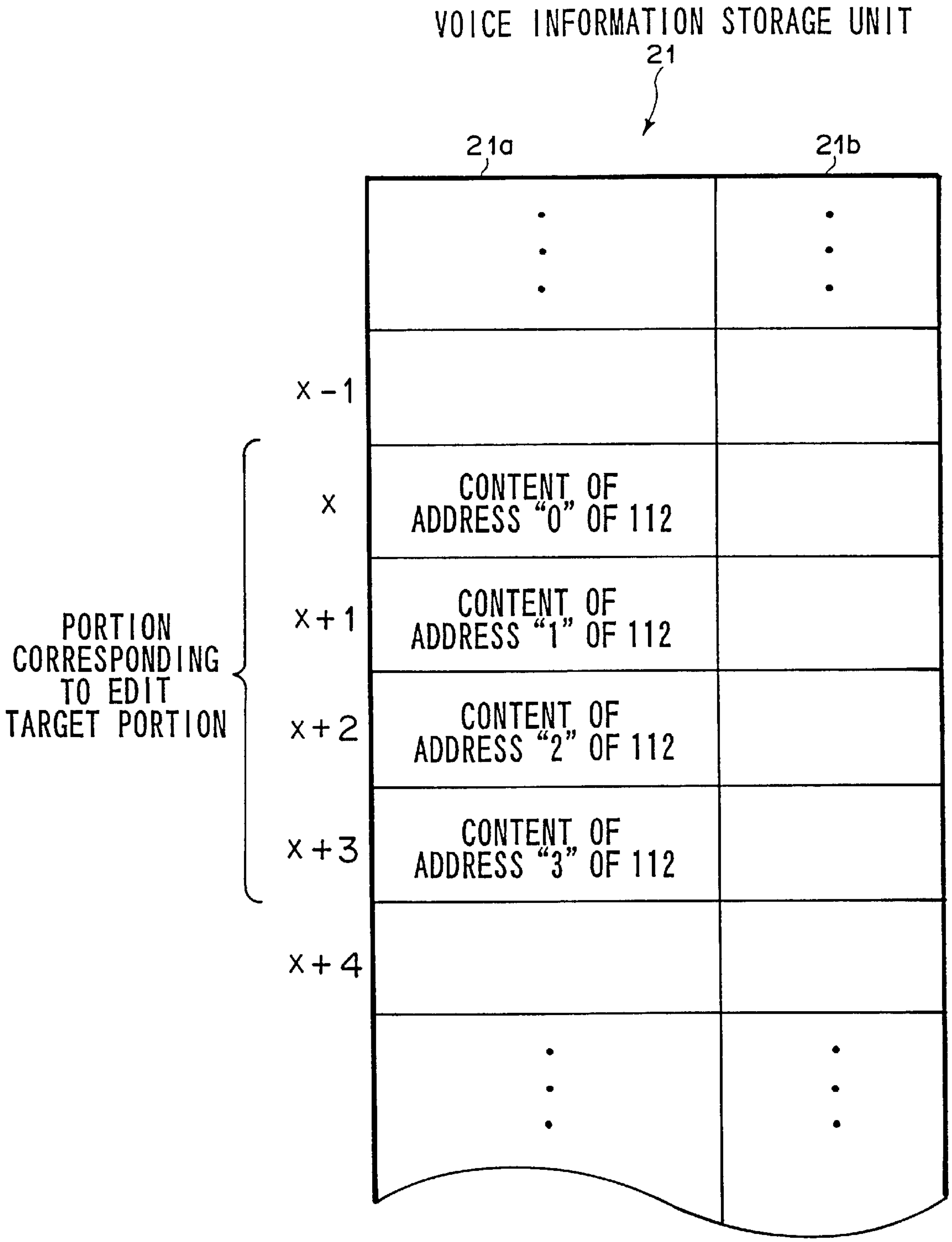
FIG. 12 is a diagram showing the operation when the correction processing is carried out.

For example, assuming that the addresses at which the voice information corresponding to the edit target portion indicated on the text by the user is stored are equal to x to (x+3) as shown in FIG. 12, the voice information/text information-converting means 11 notes the address x in step E2.

Thereafter, the voice information/text information-converting means 11 judges whether the address x of the voice information storage unit 21 being currently noted is the last address corresponding to the edit target portion and the address m=0 of the voice holder 112 which is a target to be processed is the last address of the portion in which the voice information is stored (step E3). In this case, since the address x is not the last address corresponding to the edit target portion, the judgment result of the step E3 is "NO".

If the judgment result of the step E3 is "NO", the voice information/text information-converting means 11 judges whether the address m=0 of the voice holder 112 is the last address of the portion in which the voice information is stored (step E5). Now, for example, assuming that the voice information after correction is stored at the four addresses of 0, 1, 2, 3 in the voice holder 112, the judgment result of the step E5 is "NO".

Subsequently, the voice information/text information-converting means 11 judges whether the address x being noted is the last address corresponding to the edit target portion (step E7). In this case, since the address x being noted is not the last address, the judgment result of the step E7 is "NO", and thus the processing of the step E8 is carried out.

In step E8, the voice information held at the address m=0 of the voice holder 112 is stored in the information portion 21*a* of the address x of the voice information storage unit 21. In subsequent step E9, the address x being noted is linked to the voice address list 115.

Thereafter, the voice information/text information-converting means 11 increases the processing target address m of the voice holder 112 by +1 and thus changes the address m to "1". In addition, it changes the address being noted of the voice information storage unit 21 to (x+1) (steps E10, E11), and carries out the same processing as described above. As a result, the content of the address "1" of the voice holder 112 is stored at the address (x+1) of the voice information storage unit 21 as shown in FIG. 12.

Afterwards, the same processing is repeated, and then when the address being noted of the voice information storage unit 21 is equal to (x+3) and the processing address m of the voice holder 112 is equal to "3", the judgment result of the step E3 is "YES".

When the judgment result of the step E3 is "YES", the voice information held at the address m="3" of the voice holder 112 is stored at the address (x+3) of the voice information storage unit 21 by the voice information/text information-converting means 11 (step E4), and then the address being noted (x+3) is linked to the voice address list 115 (step E21).

When the number (address number) of pre-correction voice information stored in the voice information storage unit 21, which corresponds to the edit target portion indicated on the text by the user, is equal to the number (address number) of post-correction voice information held in the voice holder 112, the content of the voice information storage unit 21 is changed to the post-correction content through the above processing.

Next, there will be described a voice information correcting operation when the number of the post-correction voice information held in the voice holder 112 is smaller than the number of the pre-correction voice information stored in the voice information storage unit 21, which corresponds to the edit target portion indicated on the text by the user.

Figure 13:
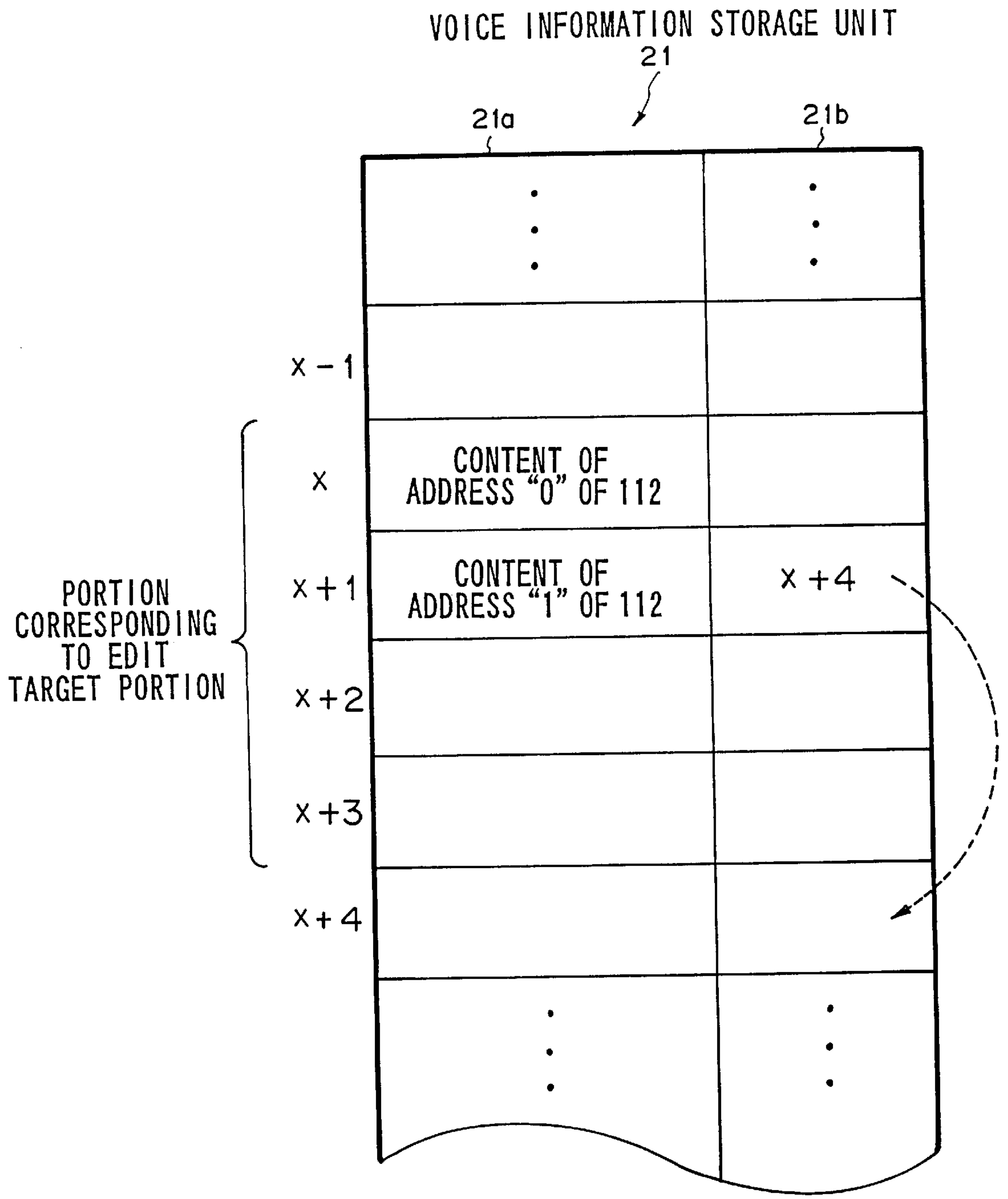
FIG. 13 is a diagram showing the operation when the correction processing is carried out.

Now, it is assumed that the addresses of the voice information storage unit 21 which correspond to an edit target portion indicated on a text by the user is addresses x to (x+3) as shown in FIG. 13, and post-correction voice information is stored at the two addresses of 0, 1 in the voice holder 112.

When the processing target address of the voice holder 112 is set to "0" in step E1 and the address x of the voice information storage unit 21 is noted in step E2, all the judgment results of the steps E3, E5, E7 are "NO", and the processing of the step E8 is carried out.

In step E8, the voice information held at the address m=0 of the voice holder 112 is stored at the address x of the voice information storage unit 21 as shown in FIG. 13. Thereafter, the voice information/text information-converting means 11 links the address x to the voice address list 115, and further sets the processing target address m of the voice holder 112 to "1". In addition, the voice information/text information-converting means 11 sets the address being noted of the voice information storage unit 21 to (x+1) (steps E9 to E11).

If the processing target address m of the voice holder 112 is equal to "1" and the address being noted of the voice information storage unit 21 is equal to (x+1), the judgment result of the step E5 is "YES", and the processing of the step E6 is carried out.

In step E6, the content of the address "1" of the voice holder 112 is stored in the information portion 21*a* of the address (x+1) of he voice information storage unit 21 as shown in FIG. 13, and the next address (x+4) to the last address (x+3) of the edit target portion is stored in the pointer portion 21*b* of the address (x+1). However, when the pointer is set at the last address (x+3) of the edit target portion, the value thereof is set in the pointer portion 21*b* of the address (x+1). Thereafter, the voice information/text information-converting means 11 carries out the processing of the step E21. Through the above processing, the correction processing on the voice information storage unit 21 is completed.

Next, there will be described a voice information correcting operation when the number of post-correction voice information held in the voice holder 112 is larger than the number of pre-correction voice information stored in the voice information storage unit 21 which corresponds to the edit target portion indicated on the text by the user.

Figure 14:
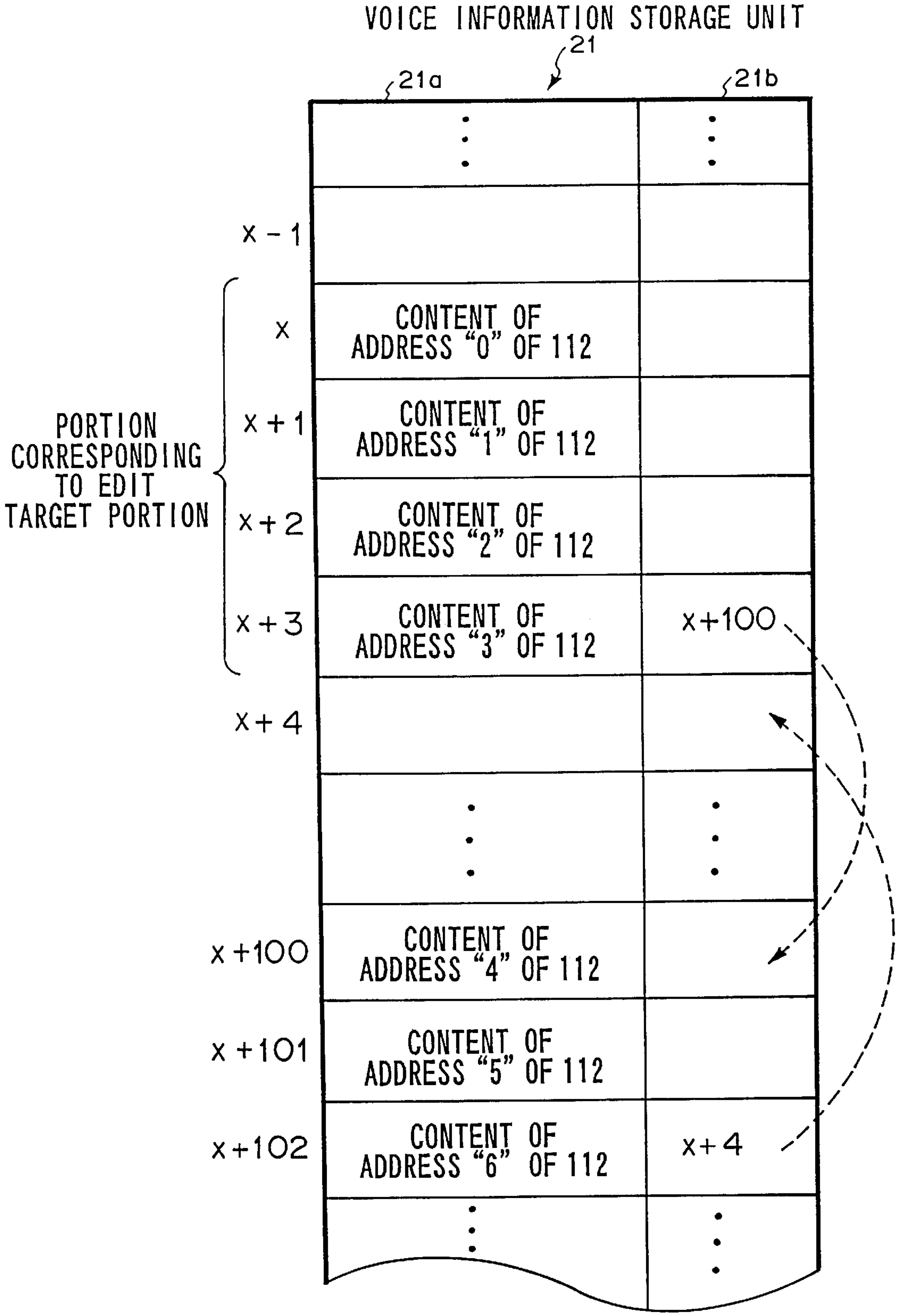
FIG. 14 is a diagram showing the operation when the correction processing is carried out.

Now, it is assumed that the addresses of the voice information storage unit 21 which correspond to the edit target portion indicated on the text by the user are equal to addresses x to (x+3) as shown in FIG. 14 and post-correction voice information is held at the addresses 0 to 6 of the voice holder 112.

When the processing target address of the voice holder 112 is set to "0" in step E1 and the address x of the voice information storage unit 21 is noted in step E2, all the judgment results of the steps E3, E5, E7 are "NO", and the processing of the step E8 is carried out.

In step E8, the voice information held at the address m=0 of the voice holder 112 is stored at the address x of the voice information storage unit 21 as shown in FIG. 14. Thereafter, the voice information/text information-converting means 11 links the address x to the voice address list 115, and further sets the processing target address m of the voice holder 112 to "1". In addition, the voice information/text information-converting means 11 sets the address being noted of the voice information storage unit 21 to (x+1) (steps E9 to E1).

Thereafter, the voice information/text information-converting means 11 performs the same processing as described above with the address m=1 of the voice holder 112 and the address (x+1) of the voice information storage unit 21 being set as processing targets. As a result, the content of the address "1" of the voice holder 112 is stored at the address (x+1) of the voice information storage unit 21 as shown in FIG. 14.

The same processing as described above is repeated, and the judgment result of the step E7 indicates "YES" when the address being noted of the voice information storage unit 21 is equal to (x+3) and the processing target address m of the voice holder 112 is equal to "3".

When the judgment result of the step E7 indicates "YES", the processing of the step E12 is carried out. In step E12, when the pointer is set at the address being noted (x+3), the value thereof is held. On the other hand, when no pointer is set, the next address (x+4) to the last address (x+3) of the edit target portion is held.

Thereafter, as shown in FIG. 14, the content of the address "3" of the voice holder 112 and the head address (x+100) of a non-used area of the voice information storage unit 21 are stored in the information portion 21*a* and the pointer portion 21*b* of the address being noted (x+3), respectively (step E13).

Subsequently, the address being noted is changed to the head address (x+100) of the non-used area, and further m is increased by +1 (thus set to "4") (steps E14, E15).

Thereafter, it is checked whether m="4" is the last address or not (step E16). In this case, since m="4" is not the last address, the judgment result of the step E16 indicates "NO".

If the judgment result of the step E16 indicates "NO", as shown in FIG. 14, the content of the address "4" of the voice holder 112 is stored at the address being noted (x+100) of the voice information storage unit 21 and the address being noted (x+100) is linked to the voice address list 115 (steps E17, E18).

Subsequently, the address being noted is changed to the next address (x+101), and m is changed to "5" (steps E19, E15). In this case, m is not the last address and thus the judgment result of the step E16 is "NO". Therefore, the content of the address "5" of the voice holder 112 is stored at the address being noted (x+101) of the voice information storage portion 21 as shown in FIG. 14, and the address being noted (x+101) is linked to the voice address list 115 (steps E17, E18).

Thereafter, the address being noted is changed to the next address (x+102) and also m is changed to "6" (steps E19, E15). In this case, since m is the last address, the judgment result of the step E16 is "YES" and thus the processing of the step E20 is carried out.

In step E20, the content of the address "6" of the voice holder 112 is stored in the information portion 21*a* of the address being noted (x+102) and the pointer held in step E12 is stored in the pointer portion 21*b* of the address being noted (x+2). Thereafter, the address being noted (x+102) is linked to the voice address list 115 (step E21).

Through the processing shown in FIG. 8, the pre-correction voice information stored in the voice information storage unit 21 is corrected on the basis of the post-correction voice information stored in the voice holder 112.

Figure 9:
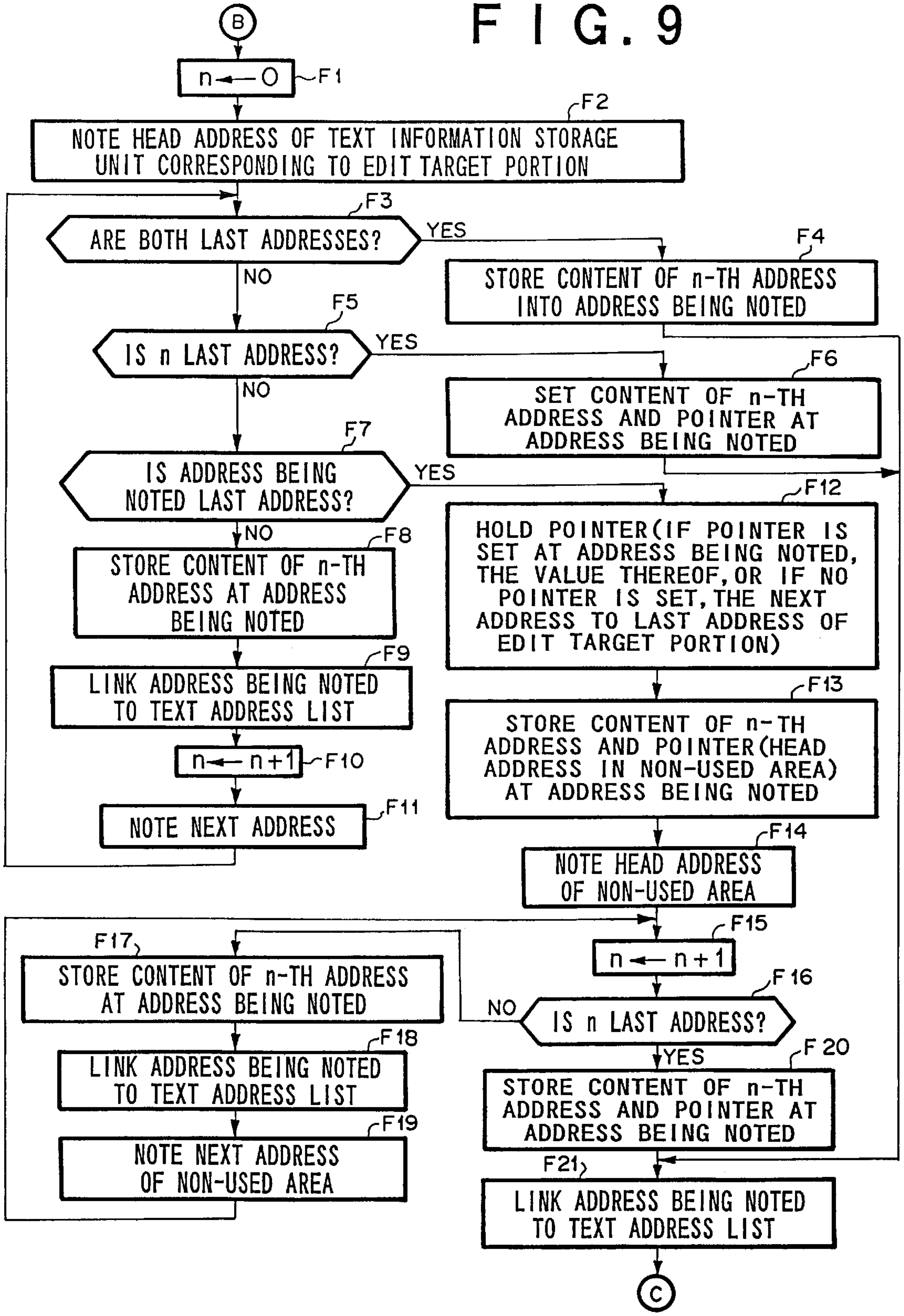
FIG. 9 is a flowchart showing the processing of the voice information/text information-converting means 11 when the correction processing is carried out.

When the processing shown in FIG. 8 is completed, the voice information text information-converting means 11 carries out the processing shown in FIG. 9.

First, the value of a variable n indicating the address of the text holder 113 is set to "0" (step F1).

Thereafter, the voice information/text information-converting means 11 notes an address of the text information storage unit 23 at which the head character code of the edit target portion indicated on the text by the user is stored (step F2). This address can be known on the basis of the text edit target portion information in an editing instruction sent from the editing means 14.

Figure 15:
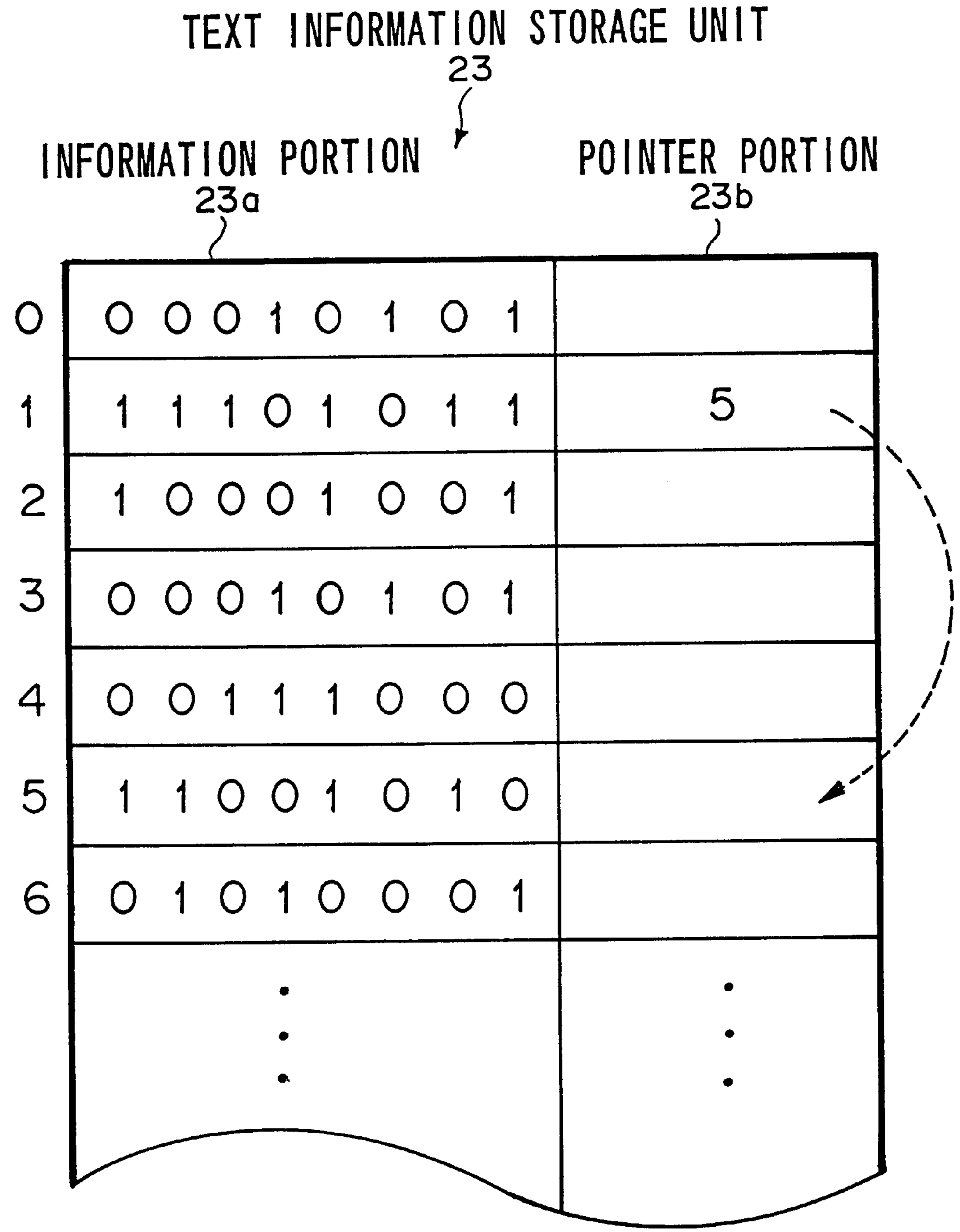
FIG. 15 is a diagram showing the construction of a text information storage unit 23.

FIG. 15 is a diagram showing the construction of the text information storage unit 23, and the text information storage unit 23 comprises an information portion 23*a* in which a Kanji-Kana mixed character code is stored, and a pointer portion 23*b* in which a pointer is stored. The pointer is used to make the display order of characters different from the address order, and it indicates an address to be next displayed. When the character of an address at which no pointer is set is displayed, the character of the next address is displayed. Accordingly, in the case of FIG. 15, the display is carried out in the order of the addresses 0, 1, 5, 6, . . . .

Figure 16:
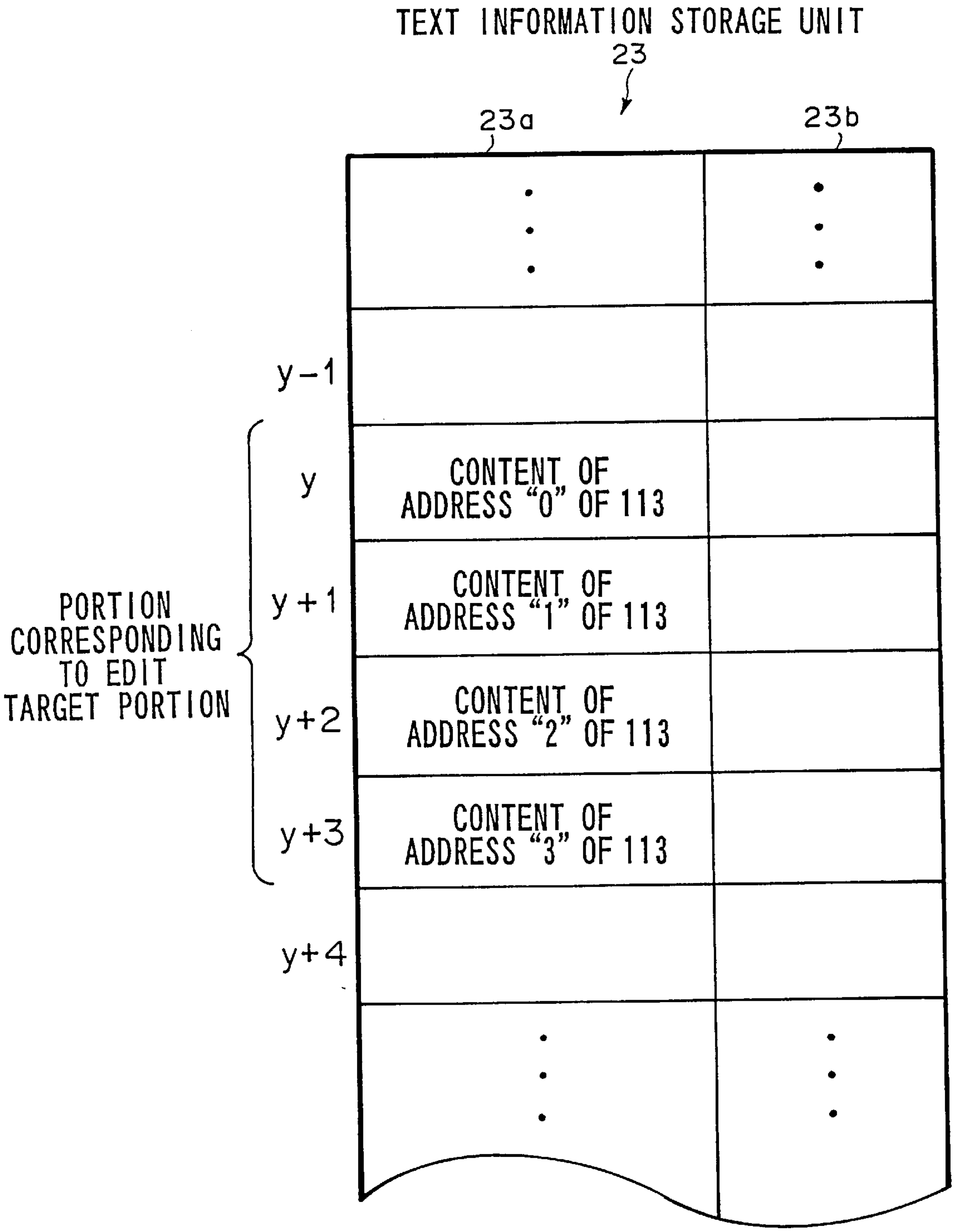
FIG. 16 is a diagram showing the operation of the correction processing is carried out.

Now, when the addresses of the text information storage unit 23 at which the text information corresponding to the edit target portion indicated on the text by the user is stored are assumed to be addresses y to (y+3) as shown in FIG. 16, the voice information/text information-converting means 11 notes the address y in step F2.

Thereafter, the voice information/text information-converting means 11 judges whether the address y of the text information storage unit 23 which is being currently noted is the last address corresponding to the edit target portion and the address n=0 of the text holder 113 to be processed is the last address of the portion in which the text information is stored (step F3). In this case, since the address y is not the last address corresponding to the edit target portion, the judgment result of the step F3 is "NO".

If the judgment result of the step F3 is "NO", the voice information/text information-converting means 11 judges whether the address n=0 of the text holder 113 is the last address of the portion in which the text information is stored (step F5). Now, assuming that post-correction text information is stored at the addresses 0, 1, 2, 3 of the text holder 113, the judgment result of the step F5 is "NO".

Subsequently, the voice information/text information-converting means 11 judges whether the address being noted (y) is the last address corresponding to the edit target portion (step F7). In this case, since the address being noted (y) is not the last address, the judgment result of the step F7 is "NO" and the processing of the step F8 is carried out.

In step F8, the character code stored at the address n="0" of the text holder 113 is stored at the address y of the text information storage unit 23 as shown in FIG. 16. In the next step F9, the address being noted (y) is linked to the text address list 116.

Thereafter, the voice information/text information-converting means 11 increases the processing target address n of the text holder 113 by +1 to change the address n to "1", also changes the address being noted of the text information storage unit 23 to (y+1) (steps F10, F11), and carries out the same processing as described above again. As a result, the content of the address "1" of the text holder 113 is stored at the address (y+1) of the text information storage unit 23 as shown in FIG. 16.

The same processing as described above is subsequently repeated, and when the address being noted of the text information storage unit 23 is equal to (y+3) and the processing address n of the text holder 113 is equal to "3", the judgment result of the step F3 indicates "YES".

When the judgment result of the step F3 indicates "YES", the voice information/text information-converting means 11 stores at the address (y+3) of the text information storage unit 23 the character code which is held at the address n="3" of the text holder 113 (step F4) as shown in FIG. 16, and then links the address being noted (y+3) to the text address list 116 (step F21).

When the number of pre-correction character codes stored in the text information storage unit 23 which correspond to the edit target portion indicated on the text by the user is equal to the number of post-correction character codes held in the text holder 113, the content of the text information storage unit 23 is changed to the post-correction content through the above processing.

Next, there will be described a text information correcting operation when the number of post-correction character codes held in the text holder 113 is smaller than the number of pre-correction character codes stored in the text information storage unit 23 which correspond to the edit target portion indicated on the text by the user.

Figure 17:
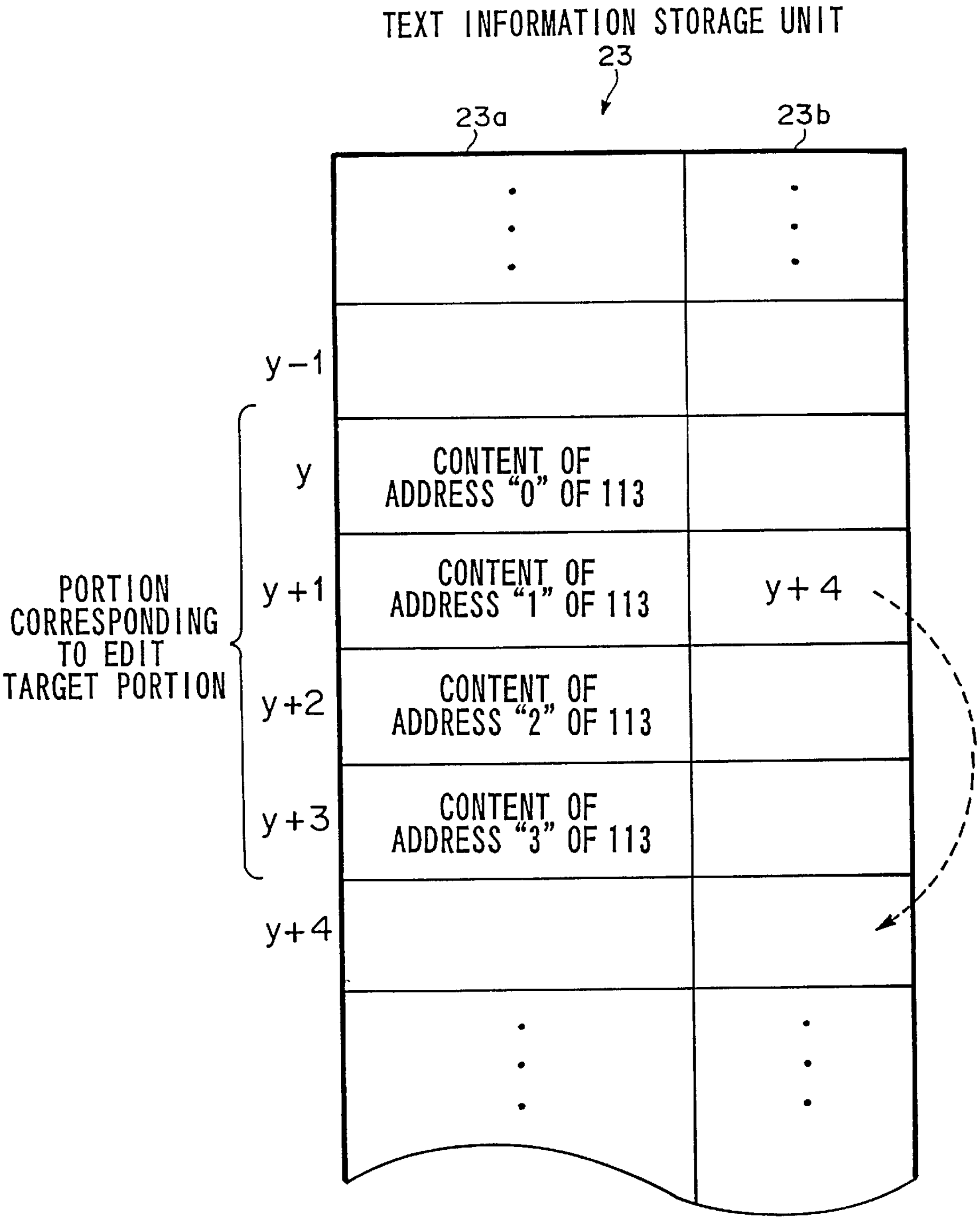
FIG. 17 is a diagram showing the operation when the correction processing is carried out.

Now, it is assumed that the addresses of the text information storage unit 23 which correspond to the edit target portion indicated on the text by the user are addresses y to (y+3) as shown in FIG. 17 and post-correction character codes are held at two addresses of 0, 1 in the text holder 113.

When the processing target address n of the text holder 113 is set to "0" in step F1 and the address y of the text information storage unit 23 is noted in step F2, all the judgment results of the steps F3, F5, F7 indicate "NO", and the processing of the step F8 is carried out.

In step F8, as shown in FIG. 17, the character code held at the address n=0 of the text holder 113 is stored at the address y of the text information storage unit 23. Thereafter, the voice information/text information-converting means 11 links the address being noted (y) to the text address list 116, and further sets the processing target address n of the text holder 113 to "1", and also it sets the address being noted (n) of the text information storage unit 23 to(y+1) (steps F9 to F11).

When the processing target address n of the text holder 113 is equal to "1" and the address being noted of the text information storage unit 23 is equal to (y+1), the judgment result of the step F5 indicates "YES" and the processing of the step F6 is carried out.

In step F6, the content of the address "1" of the text holder 113 is stored in the information portion 23*a* of the address (y+1) of the text information storage unit 23, and the next address (y+4) to the last address (y+3) of the edit target portion is stored in the pointer portion 23*b* of the address (y+1) as shown in FIG. 17. However, when the pointer is set at the last address (y+3) of the edit target portion, the value thereof is set in the pointer portion 23*b* of the address (y+1). Thereafter, the voice information/text information-converting means 11 carries out the processing of the step F21. Through the above processing, the correction processing on the text information storage unit 23 is completed.

Next, there will be described a text information correcting operation when the number of post-correction character codes held in the text holder 113 is larger than the number of pre-correction character codes stored in the text information storage unit 23 which correspond to the edit target portion indicated on the text by the user.

Figure 18:
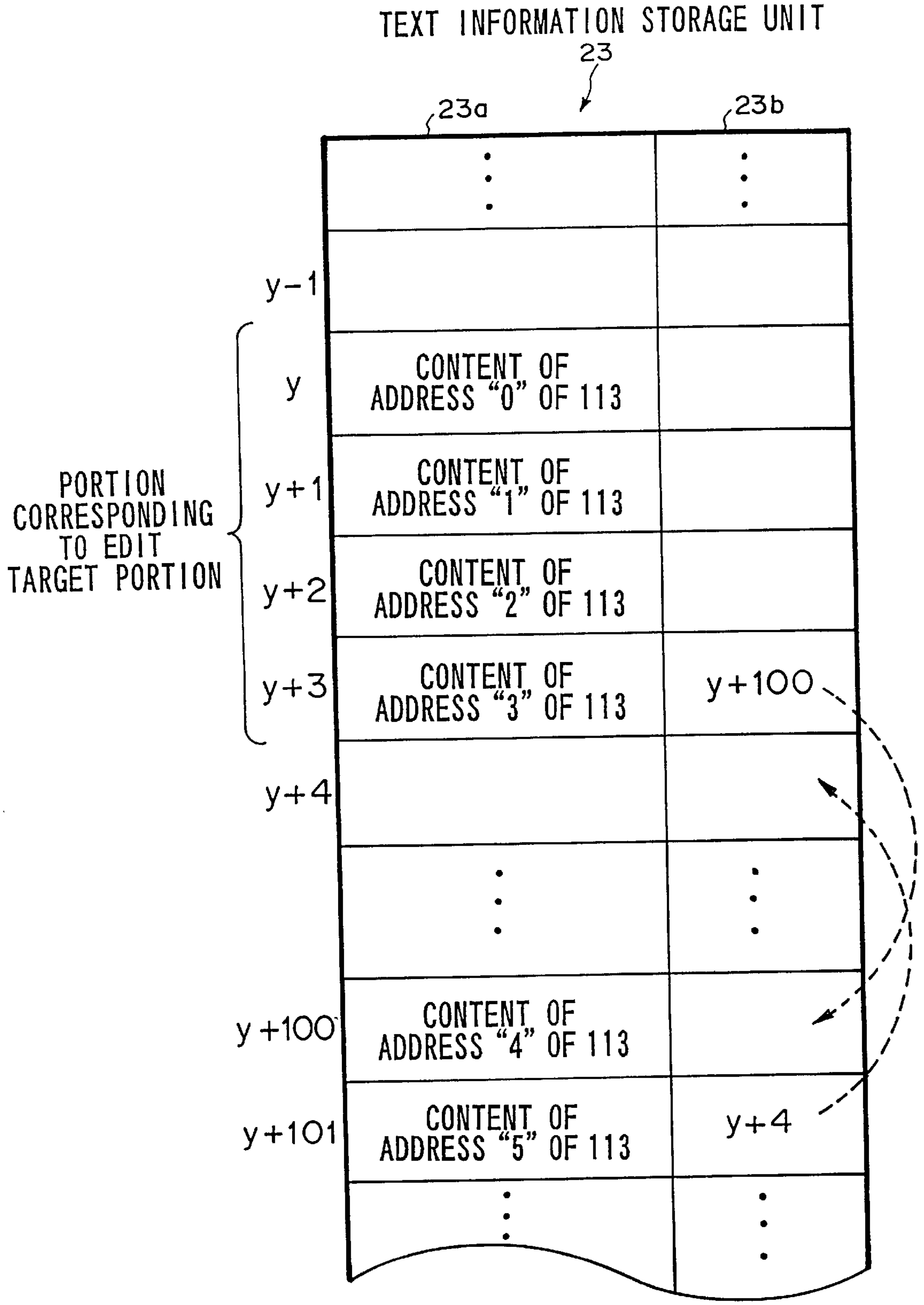
FIG. 18 is a diagram showing the operation when the correction processing is carried out.

Now, it is assumed that the addresses of the text information storage unit 23 which correspond to the edit target portion indicated on the text by the user are addresses y to (y+3) as shown in FIG. 18 and post-correction character codes are held at the addresses 0 to 5 of the text holder 113.

When the processing target address n of the text holder 113 is set to "0" in step F1 and the address y of the text information storage unit 23 is noted in step F2, all the judgments of the steps F3, F5, F7 are "NO", and the processing of the step F8 is carried out.

In step F8, the character code held at the address n=0 of the text holder 113 is stored at the address y of the text information storage unit 23 as shown in FIG. 18. Thereafter, the voice information/text information-converting means 11 links the address being noted (y) to the text address list 116, sets the processing target address n of the text holder 113 to "1" and further sets the address being noted of the text information storage unit 23 to (y+1) (steps F9 to F11).

Thereafter, the voice information/text information-converting means 11 performs the same processing as described above with the address n=1 of the text holder 113 and the address (y+1) of the text information storage unit 23 being set as processing targets. As a result, the content of the address "1" of the text holder 113 is stored at the address (y+1) of the text information storage unit 23 as shown in FIG. 18.

The same processing as described above is repeated, and when the address being noted of the text information storage unit 23 is equal to (y+3) and the processing address n of the text holder 113 is equal to "3", the judgment result of the step F7 is "YES".

The judgment result of the step F7 indicates YES, whereby the processing of the step F12 is carried out. In step F12, if a pointer is set at the address being noted (y+3), the value thereof is held. On the other hand, if no pointer is set, the next address (y+4) to the last address (y+3) of the edit target portion is held.

Thereafter, the content of the address "3" of the text holder 113 and the head address (y+100) of the non-used area of the text information storage unit 23 are stored in the information portion 23*a* and pointer portion 23*b* of the address being noted (y+3), respectively (step F13).

Subsequently, the address being noted is charged to the head address (y+100) of the non-used area and increments n by +1 to set n to "4" (steps F14, F15).

Thereafter, it is checked whether n="4" is the last address or not (step F16). In this case, since n is not the last address, the judgment result of the step F16 is "NO".

If the judgment result of the step F16 is "NO", the content of the address "4" of the text holder 113 is stored at the address being noted (y+100) of the text information storage unit 23 and further the address being noted (y+100) is linked to the text address list 116 as shown in FIG. 18 (steps F17, F18).

Thereafter, the address being noted is changed to the next address (y+101), and n is changed to "5" (steps F19, F15). In this case, since n is the last address, the judgment result of the step F16 is "YES" and the processing of the step F20 is carried out.

In step F20, as shown in FIG. 18, the content of the address "5" of the text holder 113 is stored in the information portion 23*a* of the address being noted (y+101), and the pointer held in step F12 is stored in the pointer portion 23*b* of the address being noted (y+101). Thereafter, the address being noted (y+101) is linked to the text address list 116 (step F21).

Through the processing shown in FIG. 9, the pre-correction text information stored in the text information storage unit 23 is corrected on the basis of the post-correction text information held in the text holder 113.

Figure 10:
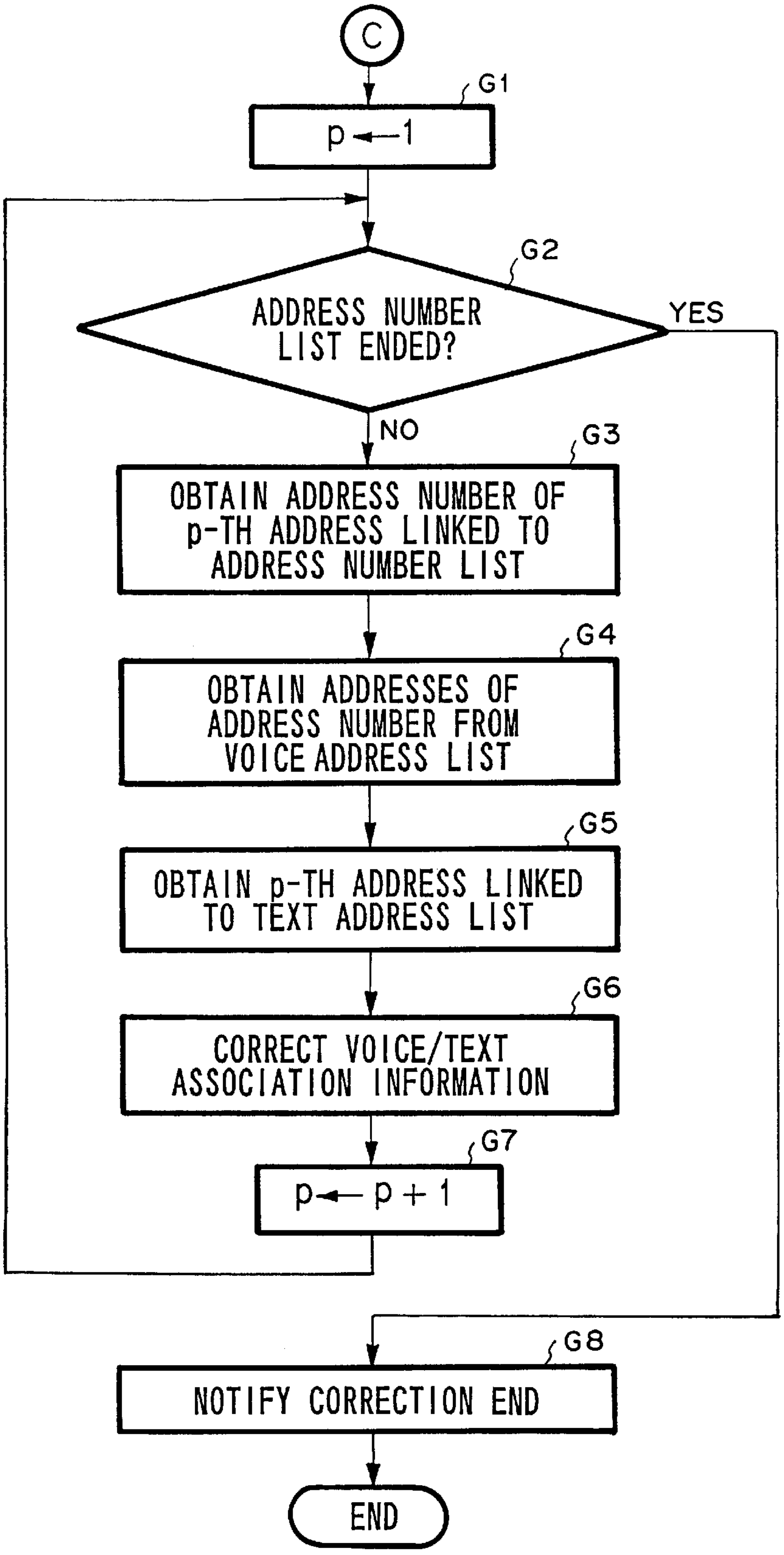
FIG. 10 is a flowchart showing the processing of the voice information/text information-converting means 11 when the correction processing is carried out.

When the processing shown in FIG. 9 is completed, the voice information/text information-converting means 11 carries out the processing shown in FIG. 10 to change the content of the voice/text association information storage unit 22 to the information indicating the corresponding relationship between the voice information and the text information after correction.

In FIG. 10, the value of a variable p indicating an address number of the address number list 114 and text address list 116 to which the information is linked is first set to "1" (step G1).

Subsequently, the first address number linked to the address number list 114 is obtained, the addresses of the address number are obtained from the voice address list 115 and then the first address linked to the text address list 116 is obtained (steps G3 to G5).

Thereafter, the content of the voice/text association information storage unit 22 is corrected on the basis of the addresses obtained in steps G4, G5 (step G6). That is, when the address obtained in the step G5 is stored in the voice/text association information storage unit 22, the address of the voice information storage unit 21 which is stored in connection with the address obtained in the step G5 is replaced by the address obtained in the step G4. On the other hand, when the address obtained in the step G5 is not stored, the addresses obtained in the steps G4 and G5 are additionally registered in association with each other in the voice/text association information storage unit 22.

Thereafter, p is increased by +1 (step G7), and the same processing as described above is repeated. When the above processing is carried out on all the information linked to the address number list 114 (the judgment of the step G2 is "YES"), the voice information/text information-converting means 11 sends a correction end notification to the editing means 14 (step G8), whereby the editing means 14 finishes the processing shown in FIG. 6.

Next, the rearrangement processing carried out in step B5 as shown in FIG. 5 will be described.

When the user changes the reproducing order of the voice information stored in the voice information storage unit 21, the user inputs "rearrangement" as the edit type from the input device 3, and also indicates an edit target portion on the text displayed on the display device 6. When the rearrangement is carried out, the user indicates a rearrangement range as the edit target portion, and a moving destination of the rearrangement range.

When the rearrangement range and the moving destination are indicated on the text by the user, the display control means 12 notifies to the editing means 14 the address of the text information storage unit 23 corresponding to the rearrangement range and the address of the text information storage unit 23 corresponding to the moving destination as text edit target portion information.

Figure 19:
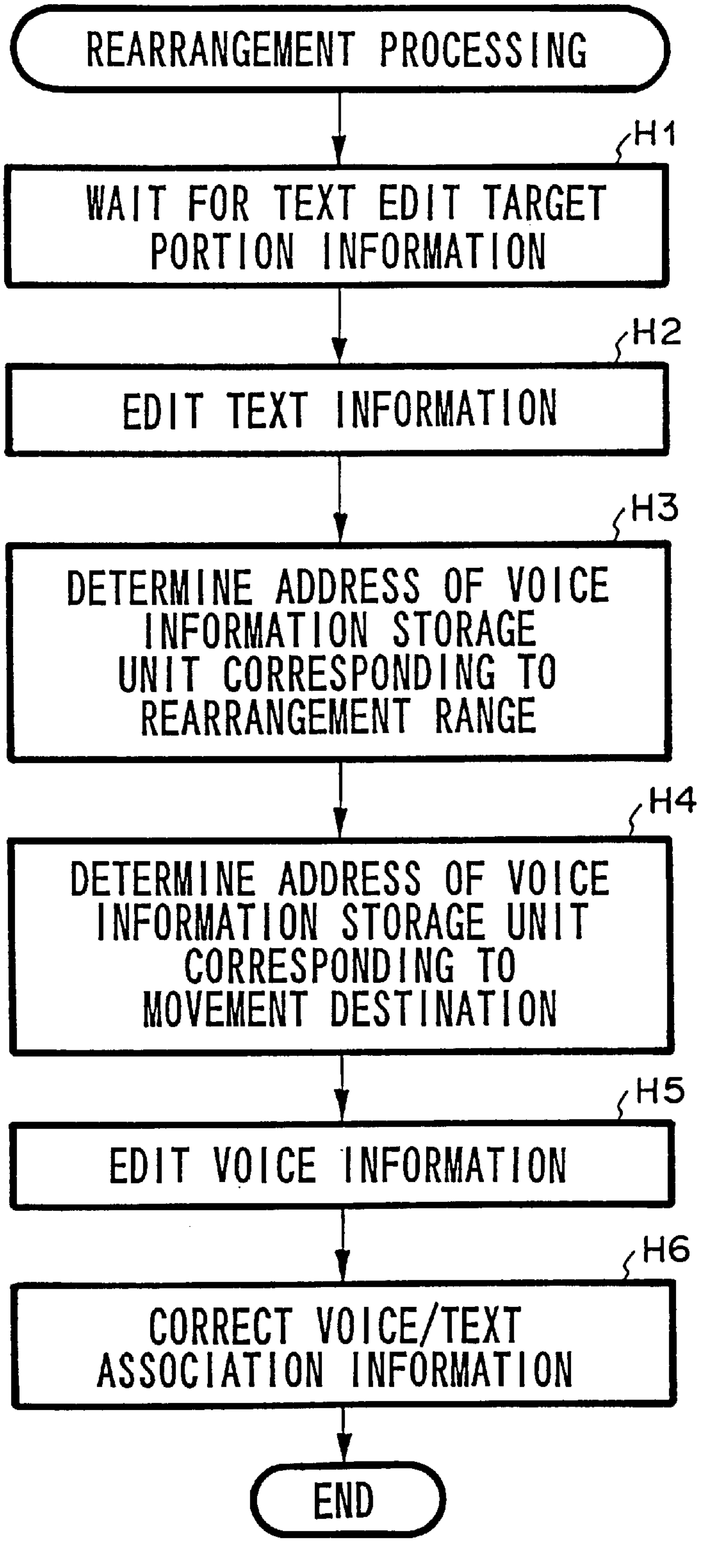
FIG. 19 is a flowchart showing the processing of the editing means 14 when rearrangement processing is carried out.

When the text edit information is sent from the display control means 12 (step H1 in FIG. 19), the editing means 14 rearranges the text information stored in the text information storage unit 23 on the basis of the text editing portion information (step H2). That is, by rewriting the content of the pointer portion 23*b* of the text information storage unit 23, the display order of the text information is changed to an order which is matched with a user's indication.

Thereafter, the editing means 14 uses the voice/text association information storage unit 22 to determine the address of the voice information storage unit 21 corresponding to the rearrangement range and the address of the voice information storage unit 21 corresponding to the moving destination (steps H3, H4), and rearranges the voice information stored in the voice information storage unit 21 on the basis of these addresses thus determined (step H5). That is, by rewriting the content of the pointer portion 21*a* of the voice information storage unit 21, the reproducing order of the voice information is changed to an order which is matched with a user's indication.

Finally, the content of the voice/text association information storage unit 22 is corrected to one which indicates the corresponding relationship between the voice information storage unit 21 and the text information storage unit 23 after the rearrangement processing (step H6).

Next, the deletion processing carried out in step B7 will be described with reference to FIG. 5.

When a part of the voice information stored in the voice information storage unit 21 is deleted, the user inputs "deletions" as the edit type from the input device 3, and indicates an edit target portion (deletion portion) on the text displayed on the display device 6. When the edit target portion is indicated, the display control means 12 notifies to the editing means 14 the address of the text information storage unit 23 corresponding to the edit target portion as the text edit target portion information.

Figure 20:
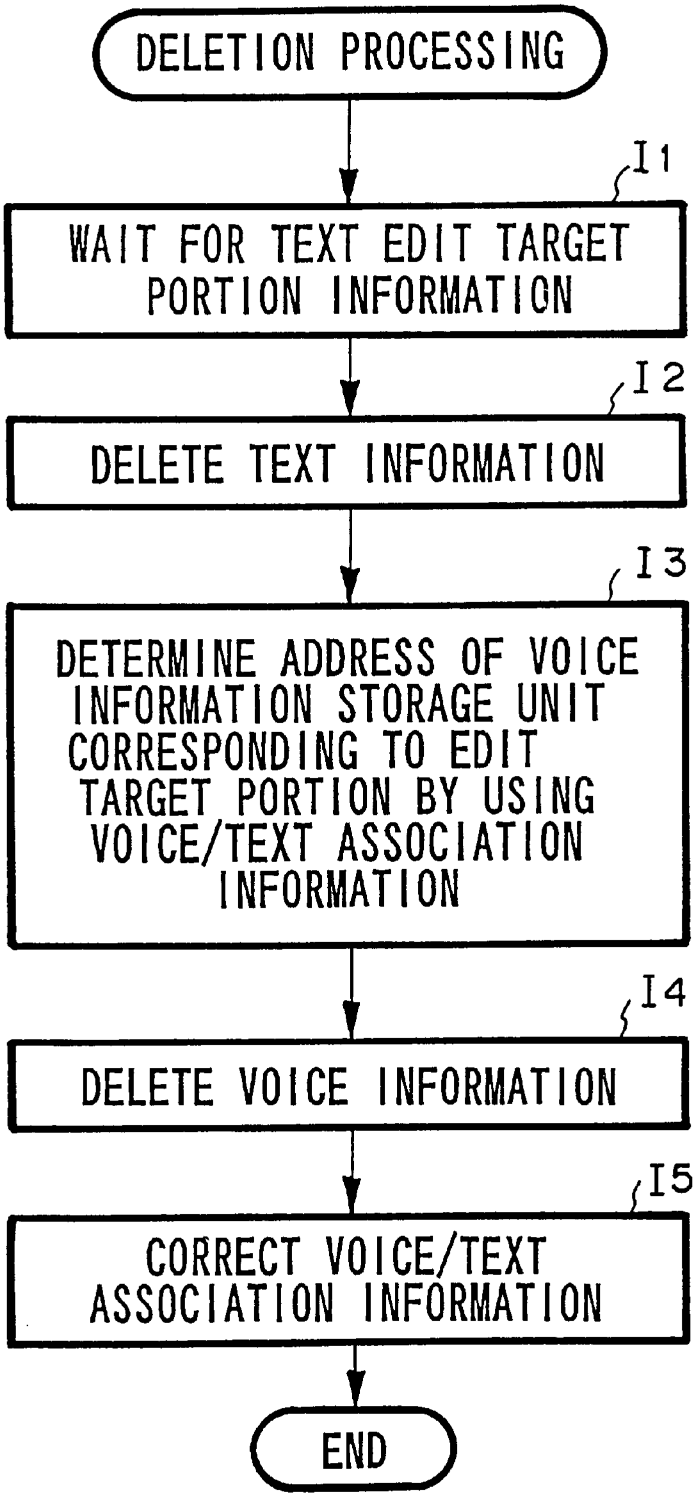
FIG. 20 is a flowchart showing the processing of the editing means 14 when deletion processing is carried out.

When the text edit target portion information is notified (step I1 in FIG. 20), on the basis of the text edit target portion information, the editing means 14 deletes text information which serves as a deletion target indicated by the user and is stored in the text information storage unit 23 (step I2). That is, the text information indicated by the user is deleted by rewriting the content of the pointer portion 23*b* of the text information storage unit 23.

Thereafter, the editing means 14 uses the voice/text association information stored in the voice/text association information storage unit 22 to determine the address of the voice information storage unit 21 corresponding to the edit target portion as the voice edit target portion information, and further uses this address to delete voice information which serves as a deletion target indicated by the user in the voice information stored in the voice information storage unit 21 (steps I3, I4). That is, the portion indicated by the user is deleted by rewriting the content of the pointer portion 21*b* of the voice information storage unit 21.

Finally, the convent of the voice/text association information storage unit 22 is corrected to one which indicates the corresponding relationship between the voice information storage unit 21 and the text information storage unit 23 after the deletion processing is finished (step I5).

Next, the text edit processing shown in step B9 of FIG. 5 will be described.

When an error exists in the text information stored in the text information storage unit 23, the user inputs "text edit" as the edit type by using the input device 3, and also corrects the text on the text displayed on the display device 6.

When the text is corrected on the display device 6, the editing means 14 edits the content of the text information storage unit 23 on the basis of the correction content, and further changes the content of the voice/text information storage unit 22 to one which indicates the corresponding relationship between the voice information storage unit 21 and the text information storage unit 23 after the text editing.

Next, the operation when a part of the voice information stored in the voice information storage unit 21 is reproduced will be described.

The user inputs a reproducing instruction from the input device 3, and also indicates a reproduction target portion on the text displayed on the display device 6. When the reproduction target portion is indicated, the display control means 12 outputs to the reproducing means 15 reproduction target portion information which indicates the address of the text information storage unit 23 corresponding to the reproduction target portion.

Figure 21:
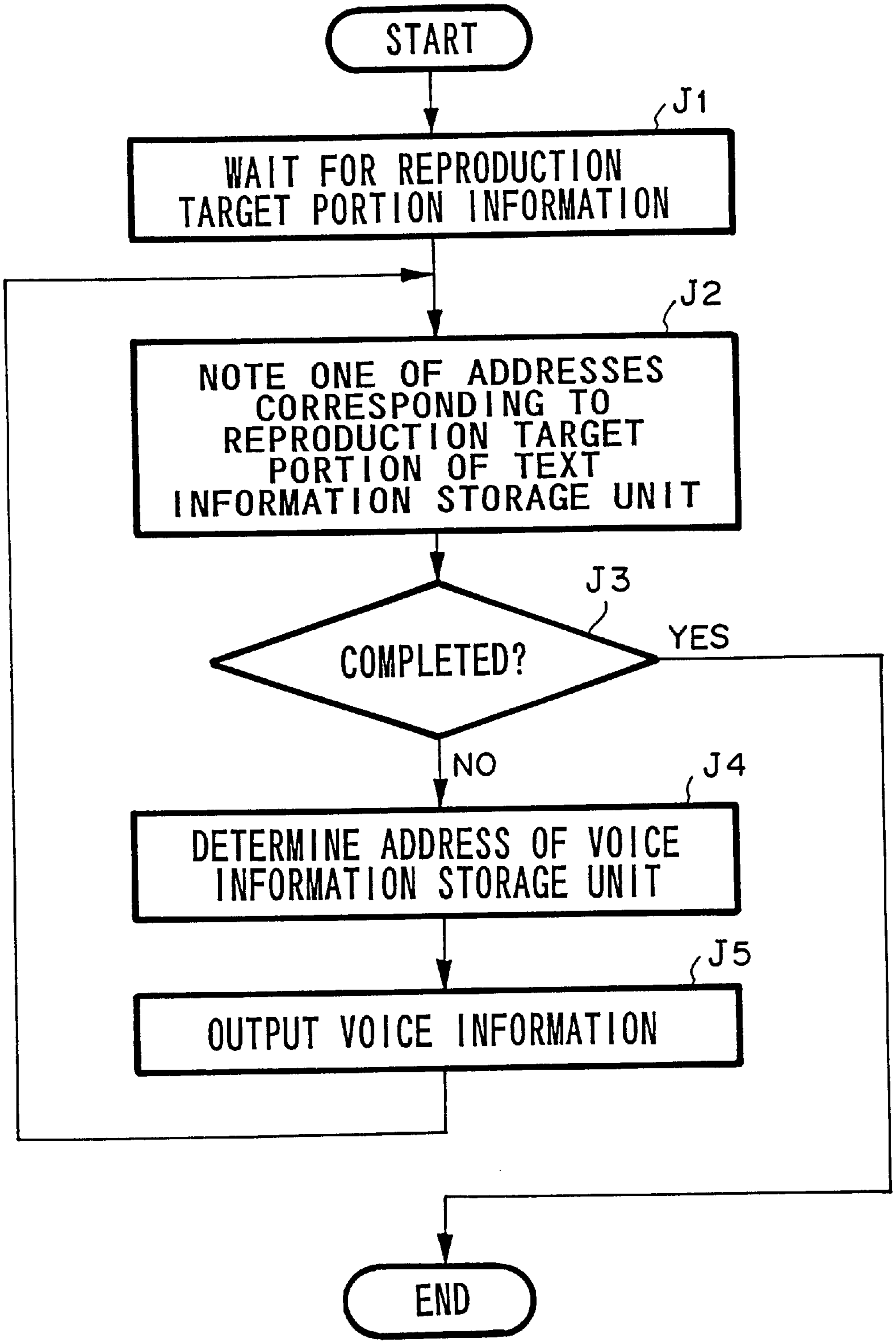
FIG. 21 is a flowchart showing the processing of reproducing means 15.

When the reproduction target portion information is output from the display control means 12 (step J1 in FIG. 21), the reproducing means 15 notes one (the head address of the reproduction target portion) of the addresses contained in the reproduction target portion information (step J2), and further determines the address of the voice information storage unit 21 corresponding to the address of the text information storage unit 23 being noted on the basis of the content of the voice/text association information storage unit 22 (step J4). Thereafter, the reproducing means 15 takes voice information out of the address of the voice information storage unit 21 determined in step J4, and outputs it to the voice output device 5 (step J5), whereby a voice is output from the voice output device 5.

Thereafter, the reproducing means 15 carries out the same processing as described above while the next address contained in the reproduction target portion information is noted. When the processing is carried on all the addresses contained in the reproduction target portion information (the judgment of step J3 is "YES", and the reproducing means 15 finishes the processing.

The present invention has a first effect that an edit such as deletion, rearrangement, correction or the like can be easily performed on voice information in short time. This is because the voice information and the text information are recorded in association with each other and the edit target portion can be indicated on the text.

The present invention has a second effect that a portion which a user wishes to reproduce can be accessed in a short-time. This is because the voice information can be reproduced by merely indicating on a text the portion which the user wishes to reproduce.

What is claimed is:

1. A voice editing device comprising:

a voice input device for inputting voices;

a voice information storage unit for storing voice information;

a text information storage unit for storing text information associated with the voice information stored in said voice information storage unit;

a voice/text association information storage unit for storing voice/text association information indicating the corresponding relationship between the voice information stored in said voice information storage unit and the text information stored in said text information storage unit;

voice information/text information-converting means for generating the voice information and text information corresponding to the voices input from said voice input device and storing the voice information and the text information thus generated into said voice information storage unit and said text information storage unit, respectively, and storing into said voice/text association information storage unit the voice/text association information indicating the corresponding relationship between the voice information and the text information stored in said voice information storage unit and said text information storage unit, respectively;

a display device for display a text;

an input device for indicating an edit target portion on the text displayed on said display device according to a user's operation and inputting an edit type;

display control means for displaying the text on said display device according to the text information stored in said text information storage unit, and outputting a text edit target portion information which corresponds to the edit target portion designated on the text and indicates the text information stored in said text information storage unit; and editing means for editing the content of said text information storage unit on the basis of the text edit target portion information output from said display control means and the edit type input from said input device, obtaining, on the basis of the text edit target portion information and the voice/text association information, a voice edit target portion which corresponds to the edit target portion indicated on the text and indicates the voice information stored in said voice information storage unit, and editing the content of said voice information storage unit on the basis of the voice edit target portion information and the edit type input from said input device.

2. The voice edit device as claimed in claim 1, wherein the edit type is deletion or rearrangement.

3. The voice edit device as claimed in claim 2, wherein when the edit type input from the input device is "correction", said editing means outputs to said voice information/text information-converting means a correcting instruction which contains a text edit target portion information indicating the text information stored in said text information storage unit and a voice edit target portion information indicating the voice information stored in said voice information storage unit, which correspond to the edit target portion indicated on the text, and when the correcting instruction is applied from said editing means, said voice information/text information-converting means corrects the content of said text information storage unit on the basis of the text edit target portion information contained in the correcting instruction and the text information corresponding to the voice input from said voice input device, and corrects the content of said voice information storage unit on the basis of the voice edit target portion information contained in the correcting instruction and the voice information corresponding to the voice input from said voice input device.

4. The voice edit device as claimed in claim 3, wherein said input device indicates a reproduction target portion on text displayed on said display device according to a user's operation and inputs a reproduction instruction, said display control means outputs a reproduction target portion information indicating text information stored in said text information storage unit, which corresponds to the reproduction target portion indicated on the text, and said voice edit device further includes reproducing means for obtaining, on the basis of the reproduction target portion information output from said display control means and the voice/text association information, voice information which is stored in said voice information storage unit and corresponds to the reproduction target portion indicated on the text when the reproduction instruction is input from said input device, and then reproducing the voice information thus obtained.

5. The voice edit device as claimed in claim 4, wherein when the contents of said voice information storage unit and said text information storage unit are edited, said editing means changes the content of said voice/text association information storage unit to one indicating the corresponding relationship between voice information and text information after correction.

6. A mechanically-readable recording medium having a program recorded therein, the program enables a computer to function as voice information/text information-converting means, display control means, and editing means, said computer having a voice input device for inputting voices, a voice information storage unit for storing voice information, a text information storage unit for storing text information associated with the voice information stored in said voice information storage unit, a voice/text association information storage unit for storing voice/text association information indicating the corresponding relationship between the voice information stored in said voice information storage unit and the text information stored in said text information storage unit, a display device for displaying a text, and an input device for indicating an edit target portion on the text displayed on said display device according to a user's operation and inputting an edit type, wherein said voice information/text information-converting means generates the voice information and text information corresponding to the voices input from said voice input device and stores the voice information and the text information thus generated into said voice information storage unit and said text information storage unit, respectively, and stores into said voice/text association information storage unit the voice/text association information indicating the corresponding relationship between the voice information and the text information stored in said voice information storage unit and said text information storage unit, respectively, wherein said display control means displays the text on said display device according to the text information stored in said text information storage unit, and outputs text edit target portion information which corresponds to the edit target portion indicated on the text and indicates the text information stored in said text information storage unit, wherein editing means edits the content of said text information storage unit on the basis of the text edit target portion information output from said display control means and the edit type input from said input device, obtains, on the basis of the text edit target portion information and the voice/text association information, a voice edit target portion which corresponds to the edit target portion indicated on the text and indicates the voice information stored in said voice information storage unit, and edits the content of said voice information storage unit on the basis of the voice edit target portion information and the edit type input from said input device.

* * * * *